(12) United States Patent
Brent, Jr. et al.

(10) Patent No.: US 10,683,614 B2
(45) Date of Patent: Jun. 16, 2020

(54) DEFLECTING MEMBER FOR MAKING FIBROUS STRUCTURES

(71) Applicant: The Procter & Gamble Company, Cincinnati, OH (US)

(72) Inventors: John Leslie Brent, Jr., Springboro, OH (US); James Michael Singer, Liberty Township, OH (US); John Allen Manifold, Sunman, IN (US); Mario M. Castillo, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 42 days.

(21) Appl. No.: 15/794,027

(22) Filed: Oct. 26, 2017

(65) Prior Publication Data

US 2018/0119354 A1 May 3, 2018

Related U.S. Application Data

(60) Provisional application No. 62/527,062, filed on Jun. 30, 2017, provisional application No. 62/413,585, filed on Oct. 27, 2016.

(51) Int. Cl.
*D21F 1/00* (2006.01)
*B32B 3/16* (2006.01)
(Continued)

(52) U.S. Cl.
CPC ............... *D21F 1/009* (2013.01); *B32B 3/16* (2013.01); *B32B 3/263* (2013.01); *B32B 3/266* (2013.01);
(Continued)

(58) Field of Classification Search
CPC .......... D21F 1/10; D21F 1/105; D21F 1/0027; D21F 1/0036; D21F 1/0063; D21F 5/18; D21F 5/181; D21F 5/185; D21F 1/009; D21F 7/08; D21F 7/083; D21F 7/12; D21F 11/006; D21F 11/14; D21F 11/145; D21F 27/002; D21F 27/004; D21F 27/005; D21F 27/007; D21F 27/02; B31F 1/07;
(Continued)

(56) References Cited

U.S. PATENT DOCUMENTS 3,034,180 A * 5/1962 Greiner ................. D04H 1/495
162/114
3,322,617 A * 5/1967 Osborne ............. B01D 39/086
139/425 A (Continued)

FOREIGN PATENT DOCUMENTS

EP        2123826 A2    5/2009
WO  WO 2003/082550   10/2003
(Continued)

OTHER PUBLICATIONS

U.S. Appl. No. 15/132,291, filed Apr. 19, 2016, John Allen Manifold, et al.

(Continued)

*Primary Examiner* — Eric Hug
(74) *Attorney, Agent, or Firm* — Andrew J. Mueller; Richard L. Alexander

(57) ABSTRACT

A deflection member that includes a reinforcing member and a plurality of tiles fastened to the reinforcing member.

18 Claims, 12 Drawing Sheets

(51) Int. Cl.

| | | |
|---|---|---|
| *B32B 3/26* | (2006.01) | |
| *B32B 3/30* | (2006.01) | |
| *B32B 7/04* | (2019.01) | |
| *D21F 11/00* | (2006.01) | |
| *D21F 11/14* | (2006.01) | |
| *D03D 25/00* | (2006.01) | |
| *D21F 7/08* | (2006.01) | |
| *D01F 6/90* | (2006.01) | |
| *B32B 5/02* | (2006.01) | |
| *D03D 1/00* | (2006.01) | |
| *C08K 7/20* | (2006.01) | |
| *B32B 7/08* | (2019.01) | |
| *C08K 7/02* | (2006.01) | |
| *D21H 27/00* | (2006.01) | |
| *D21H 27/02* | (2006.01) | |
| *B31F 1/16* | (2006.01) | |
| *B29K 105/00* | (2006.01) | |
| *B29K 23/00* | (2006.01) | |

(52) U.S. Cl.
CPC ............... *B32B 3/30* (2013.01); *B32B 5/024* (2013.01); *B32B 7/08* (2013.01); *C08K 7/02* (2013.01); *C08K 7/20* (2013.01); *D01F 6/90* (2013.01); *D03D 1/0094* (2013.01); *D03D 25/005* (2013.01); *D21F 1/0036* (2013.01); *D21F 1/0063* (2013.01); *D21F 7/08* (2013.01); *D21F 11/006* (2013.01); *D21F 11/145* (2013.01); *B29K 2023/0608* (2013.01); *B29K 2023/12* (2013.01); *B29K 2105/0085* (2013.01)

(58) Field of Classification Search
CPC .. B31F 1/12; B31F 1/122; B31F 1/124; B31F 1/126; B31F 1/128; B31F 1/16; B32B 3/10; B32B 3/14; B32B 3/16; B32B 3/26; B32B 3/263; B32B 3/266; B32B 3/30; B32B 7/04; B32B 7/05; B32B 7/06; B32B 7/08; B32B 7/09; B32B 7/12
USPC ..... 162/109–117, 280, 296, 348, 358.2, 361, 162/362, 900, 902, 903
See application file for complete search history.

(56) References Cited

U.S. PATENT DOCUMENTS

| | | |
|---|---|---|
| 4,528,239 A | 7/1985 | Trokhan |
| 4,537,658 A | 8/1985 | Albert |
| 4,828,563 A | 5/1989 | Muller-Lierheim |
| 4,842,905 A * | 6/1989 | Stech ............ D21F 1/0063 162/348 |
| 5,658,334 A | 8/1997 | Caldarise et al. |
| 5,893,965 A | 4/1999 | Trokhan et al. |
| 5,948,210 A | 9/1999 | Huston |
| 6,420,100 B1 | 7/2002 | Trokhan et al. |
| 6,514,382 B1 | 2/2003 | Kakiuchi et al. |
| 6,576,090 B1 | 6/2003 | Trokhan et al. |
| 6,660,362 B1 | 12/2003 | Lindsay et al. |
| 6,878,238 B2 | 4/2005 | Bakken |
| 7,005,043 B2 | 2/2006 | Toney et al. |
| 7,014,735 B2 | 3/2006 | Kramer et al. |
| 7,005,044 B2 | 4/2006 | Kramer et al. |
| 7,105,465 B2 | 9/2006 | Patel et al. |
| 7,799,382 B2 | 9/2010 | Payne et al. |
| 8,216,427 B2 | 7/2012 | Klerelid et al. |
| 8,454,800 B2 | 6/2013 | Mourad et al. |
| 8,470,133 B2 | 6/2013 | Cunnane et al. |
| 8,758,569 B2 | 6/2014 | Aberg et al. |
| 8,801,903 B2 | 8/2014 | Mourad et al. |
| 8,815,057 B2 | 8/2014 | Eberhardt et al. |
| 8,822,009 B2 | 9/2014 | Riviere et al. |
| 9,005,710 B2 | 4/2015 | Jones et al. |
| 9,926,667 B2 | 3/2018 | Manifold |
| 9,938,666 B2 | 4/2018 | Manifold |
| 9,976,261 B2 | 5/2018 | Manifold |
| 10,214,856 B2 | 2/2019 | Manifold |
| 10,240,298 B2 | 3/2019 | Manifold |
| 10,385,509 B2 | 8/2019 | Manifold |
| 10,465,340 B2 | 11/2019 | Manifold |
| 2004/0109972 A1* | 6/2004 | Baker ............ B32B 3/14 428/59 |
| 2005/0123726 A1 | 6/2005 | Broering et al. |
| 2005/0280184 A1 | 11/2005 | Sayers et al. |
| 2006/0019567 A1 | 1/2006 | Sayers |
| 2006/0127641 A1 | 6/2006 | Barnholtz et al. |
| 2006/0278298 A1 | 12/2006 | Ampulski et al. |
| 2007/0116928 A1* | 5/2007 | Monnerie ............ D04H 3/02 428/147 |
| 2007/0137814 A1 | 6/2007 | Gao |
| 2007/0170610 A1 | 7/2007 | Payne et al. |
| 2008/0199655 A1 | 8/2008 | Monnerie et al. |
| 2008/0245498 A1 | 10/2008 | Ostendorf et al. |
| 2010/0119779 A1 | 5/2010 | Ostendorf et al. |
| 2011/0265967 A1 | 11/2011 | Phan |
| 2012/0043036 A1 | 2/2012 | Polat et al. |
| 2013/0319625 A1 | 12/2013 | Mohammad |
| 2014/0004307 A1 | 2/2014 | Sheehan |
| 2014/0272269 A1 | 9/2014 | Hensen |
| 2015/0102526 A1 | 4/2015 | Ward et al. |
| 2016/0060811 A1 | 3/2016 | Riding et al. |
| 2016/0090692 A1 | 3/2016 | Eagles et al. |
| 2016/0090693 A1 | 3/2016 | Eagles et al. |
| 2016/0159007 A1 | 6/2016 | Miller et al. |
| 2016/0185041 A1 | 6/2016 | Lisagor et al. |
| 2016/0185050 A1 | 6/2016 | Topolkaraev et al. |
| 2016/0319483 A1 | 11/2016 | Manifold et al. |
| 2016/0354979 A1 | 12/2016 | Manifold et al. |
| 2016/0355988 A1 | 12/2016 | Manifold et al. |
| 2016/0369452 A1 | 12/2016 | Manifold et al. |
| 2017/0275822 A1 | 9/2017 | Manifold |
| 2018/0119347 A1 | 5/2018 | Brent, Jr. |
| 2018/0119348 A1 | 5/2018 | Brent, Jr. |
| 2018/0119350 A1 | 5/2018 | Brent, Jr. |
| 2018/0119354 A1 | 5/2018 | Brent |
| 2018/0230656 A1 | 8/2018 | Manifold |
| 2018/0237991 A1 | 8/2018 | Manifold |
| 2019/0161912 A1 | 5/2019 | Manifold |
| 2019/0161917 A1 | 5/2019 | Manifold |
| 2019/0330799 A1 | 10/2019 | Manifold |
| 2019/0330800 A1 | 10/2019 | Manifold |

FOREIGN PATENT DOCUMENTS

| | | |
|---|---|---|
| WO | WO 2003/82550 A2 | 10/2003 |
| WO | WO 2004/45834 A1 | 6/2004 |
| WO | WO 2015/000755 | 1/2015 |
| WO | WO 2015/00755 A1 | 1/2015 |
| WO | WO 2016/085704 A1 | 6/2016 |

OTHER PUBLICATIONS

U.S. Appl. No. 15/132,293, filed Apr. 19, 2016, John Allen Manifold, et al.

U.S. Appl. No. 15/132,295, filed Apr. 19, 2016, John Allen Manifold, et al.

U.S. Appl. No. 15/180,211, filed Jun. 3, 2016, John Allen Manifold, et al.

U.S. Appl. No. 15/462,949, filed Jun. 20, 2016, John Allen Manifold, et al.

U.S. Appl. No. 15/462,950, filed Jun. 20, 2017, John Allen Manifold, et al.

U.S. Appl. No. 15/794,025, filed Oct. 26, 2017, John Leslie Brent, Jr., et al.

U.S. Appl. No. 15/794,026, filed Oct. 26, 2017, John Leslie Brent, Jr., et al.

U.S. Appl. No. 15/795,329, filed Oct. 26, 2017, John Leslie Brent, Jr., et al.

(56) References Cited

OTHER PUBLICATIONS

U.S. Appl. No. 15/795,339, filed Oct. 26, 2017, John Leslie Brent, Jr., et al.
U.S. Appl. No. 15/796,067, filed Oct. 26, 2017, Jeffrey Glen Sheehan.
PCT International Search Report dated Aug. 19, 2016—5 pages.
PCT International Search Report dated Jul. 12, 2016—4 pages.
Copy of PCT International Search Report dated Jul. 12, 2016—4 pages.
PCT International Search Report dated Aug. 9, 2016—4 pages.
PCT International Search Report dated May 29, 2017—4 pages.
Copy of PCT International Search Report dated May 29, 2017—4 pages.
International Search Report dated Jan. 18, 2018—5 pages.
All Office Actions Application U.S. Appl. No. 15/180,211.
All Office Actions Application U.S. Appl. No. 15/132,291.
All Office Actions U.S. Appl. No. 15/132,293.
All Office Actions U.S. Appl. No. 15/132,295.
All Office Actions U.S. Appl. No. 15/462,949.
All Office Actions U.S. Appl. No. 15/462,950.
All Office Actions U.S. Appl. No. 15/794,025.
All Office Actions U.S. Appl. No. 15/794,026.
All Office Actions U.S. Appl. No. 15/794,027.
All Office Actions U.S. Appl. No. 15/795,329.
All Office Actions U.S. Appl. No. 15/795,339.
All Office Actions U.S. Appl. No. 15/796,067.
All Office Actions U.S. Appl. No. 15/180,211 (P&G case 13892).
All Office Actions U.S. Appl. No. 15/132,291 (P&G case 13831).
All Office Actions U.S. Appl. No. 15/910,062 (P&G case 13831D).
All Office Actions U.S. Appl. No. 16/503,796 (P&G case 13831DD).
All Office Actions U.S. Appl. No. 15/132,293 (P&G case 13832).
All Office Actions U.S. Appl. No. 15/947,899 (P&G case 13832C).
All Office Actions U.S. Appl. No. 16/264,857 (P&G case 13832CC).
All Office Actions U.S. Appl. No. 15/892,508 (P&G case 13892C).
All Office Actions U.S. Appl. No. 16/503,749 (P&G case 13892CC).
All Office Actions U.S. Appl. No. 15/132,295 (P&G case 13833).
All Office Actions U.S. Appl. No. 15/462,949 (P&G case 14268).
All Office Actions U.S. Appl. No. 15/462,950 (P&G case 14269).
All Office Actions U.S. Appl. No. 15/794,025 (P&G case 14867).
All Office Actions U.S. Appl. No. 15/794,026 (P&G case 14868).
All Office Actions U.S. Appl. No. 15/795,329 (P&G case 14870M).
All Office Actions U.S. Appl. No. 15/795,339 (P&G case 15003).
All Office Actions U.S. Appl. No. 15/796,067 (P&G case 15004).

* cited by examiner

DEFLECTING MEMBER FOR MAKING FIBROUS STRUCTURES

FIELD OF THE INVENTION

The present invention is related to deflection members for making strong, soft, absorbent fibrous webs, such as, for example, paper webs. More particularly, this invention is concerned with structured fibrous webs, equipment used to make such structured fibrous webs, and processes therefor.

BACKGROUND OF THE INVENTION

Products made from a fibrous web are used for a variety of purposes. For example, paper towels, facial tissues, toilet tissues, napkins, and the like are in constant use in modern industrialized societies. The large demand for such paper products has created a demand for improved versions of the products. If the paper products such as paper towels, facial tissues, napkins, toilet tissues, mop heads, and the like are to perform their intended tasks and to find wide acceptance, they must possess certain physical characteristics.

Among the more important of these characteristics are strength, softness, absorbency, and cleaning ability. Strength is the ability of a paper web to retain its physical integrity during use. Softness is the pleasing tactile sensation consumers perceive when they use the paper for its intended purposes. Absorbency is the characteristic of the paper that allows the paper to take up and retain fluids, particularly water and aqueous solutions and suspensions. The absolute quantity of fluid a given amount of paper will hold is important, but also the rate at which the paper will absorb the fluid. Cleaning ability refers to a fibrous structures' capacity to remove and/or retain soil, dirt, or body fluids from a surface, such as a kitchen counter, or body part, such as the face or hands of a user.

Through-air drying ("TAD") papermaking belts comprising a reinforcing member and a resinous framework, and/or the fibrous webs made using these belts, are known and described, for example, in commonly assigned U.S. Pat. No. 4,528,239, issued Jul. 9, 1985 to Trokhan. Trokhan teaches a belt in which the resinous framework is joined to the fluid-permeable reinforcing member (such as a woven structure, or a felt). The resinous framework may be continuous, semi-continuous, comprise a plurality of discrete protuberances, or any combination thereof. The resinous framework extends outwardly from the reinforcing member to form a web-side of the belt (i.e., the surface upon which the web is disposed during a papermaking process), a backside opposite to the web-side, and deflection conduits extending therebetween. The deflection conduits provide spaces into which papermaking fibers deflect under application of a pressure differential during a papermaking process. Because of this quality, such papermaking belts are also known in the art as "deflection members."

An improvement on deflection members to be used as papermaking belts to provide paper having increased surface area is disclosed in commonly assigned U.S. patent application Ser. No. 15/132,291, filed Apr. 19, 2016 in the name of Manifold et al., teaching deflection members made via additive manufacturing, such as 3-D printing.

However, the deflection members and processes of Manifold et al. can be improved in areas related to the economical commercialization of processes regarding commercial papermaking machines or commercial nonwoven making. Improvements can be made with respect to the size of an additively manufactured deflection member and its durability when used to make a fibrous web. Papermaking processes, for example, can require belts as wide as 110 or 220 inches and as long as 60 meters, and can be required to endure extreme temperatures, tensions, and pressures in a cyclic process.

Accordingly, there is an unmet need for a deflection member having a three-dimensional topography afforded by additive manufacturing on which fibrous webs can be formed, and which can endure the processing environment of a fibrous web making machine.

Additionally, there is an unmet need for a method for making a deflection member having a three-dimensional topography afforded by additive manufacturing on which fibrous webs can be formed, and which can endure the processing environment of a fibrous web making machine.

Additionally, there is a need for improved nonwovens for use as topsheets in baby care and fem care products. Accordingly, there is an unmet need for a deflection member having a three-dimensional topography afforded by additive manufacturing on which nonwoven webs can be formed, and which can endure the processing environment of a nonwoven web making machine. Further, there is an unmet need for a method for making a deflection member having a three-dimensional topography afforded by additive manufacturing on which nonwoven webs can be formed, and which can endure the processing environment of a nonwoven web making machine.

SUMMARY OF THE INVENTION

A deflection member is disclosed. The deflection member includes a reinforcing member and a plurality of tiles fastened to the reinforcing member.

DETAILED DESCRIPTION OF THE INVENTION

Deflection Member:

The deflection member of the present invention has a portion described herein as a "reinforcing member," and a portion described herein as a "patterned framework" having voids and/or protuberances. The deflection members detailed herein may be continuous belts, a portion of a continuous belt, endless belts, and/or seamless belts. The patterned framework can be a structure made up of one or more tiles manufactured by molding processes, such as injection molding, or by additive manufacturing processes, including what is commonly described as "3-D printing." Visually, the deflection members as detailed herein can resemble deflection members in which a resinous framework is UV-cured to a reinforcing member and used in a papermaking process, and it will therefore be described in similar terms. The term "deflection member" as used herein refers to a structure useful for making fibrous webs such as absorbent paper products or nonwoven webs, and which has protuberances and/or voids, which are openings in the tile through which fibers can pass, that define deflection conduits. A deflection member may comprise different features and different materials for the different features, such as the patterned framework and reinforcing member as described below. In particular, as described herein, a patterned framework can comprise a plurality of tiles, with each tile being a portion of the patterned framework. In one form, the entirety of a surface of a reinforcing member is substantially covered with closely fitting tiles to achieve a deflection member in a belt form suitable for manufacturing paper products and/or nonwoven webs.

Figure 1:
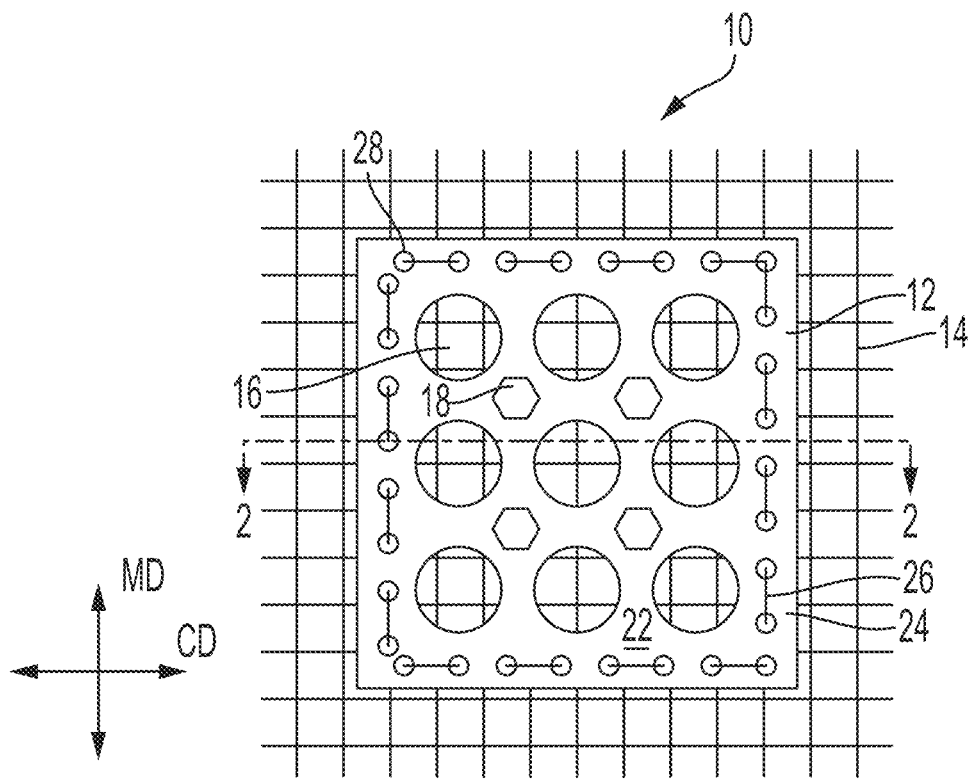
FIG. 1 is a plan view of a form of a deflection member of the present invention.
Figure 2:
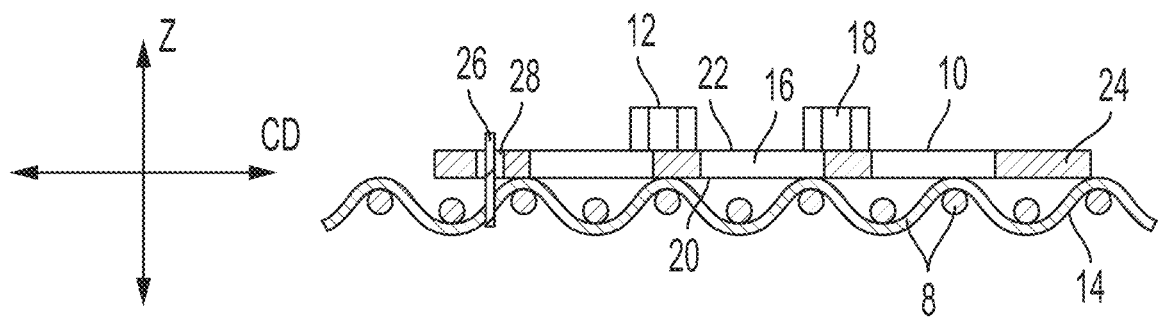
FIG. 2 is a cross-sectional view of the deflection member shown in FIG. 1, taken along lines 2-2 of FIG. 1.

As illustrated in FIGS. 1 and 2, a deflection member 10 of the present disclosure may have a patterned framework 12. In FIGS. 1 and 2, the exemplified patterned framework is a single tile 24 utilized to illustrate the general concept, but in many forms, patterned framework 12 will be a plurality of tiles. Accordingly, as detailed herein, while portions of the description/drawings may reference a single tile, such description also encompasses the forms of deflection member 10 that include a patterned framework 12 including a plurality of tiles. The deflection member 10 may comprise three components: (1) one or more tiles 24 (e.g., a plurality of tiles) that make up a patterned framework 12; (2) a reinforcing member 14 or one or more portions of the reinforcing member; and (3) one or more fastening elements 26 (e.g., a plurality of fastening elements), which can be, for example, a sewing/stitching thread or filament, a rivet, adhesive, curable resin (e.g., UV curable resins, epoxies), mechanical fasteners, combinations thereof, or other similar element(s) that can attach a tile 24 to the reinforcing member 14.

Various types of specific fastening elements 26 are further detailed herein. In the form of deflection member 10 that is illustrated in FIGS. 1 and 2, fastening element 26 is a thread that is used to stitch patterned framework 12 to reinforcing member 14. The figures illustrating defection member 10 with stitching utilized as fastening element 26 will be used herein to help describe the general concept of deflection members that have the three components detailed above; however, stitching is just one variation of the fastening element and is not limiting. Accordingly, any general description of deflection member 10 detailed herein, or other elements of the deflection member detailed herein (tiles/patterned framework, reinforcing member), may be combined with any of the variations of fastening element 26, 26A, 26B, 26C, 26D detailed herein.

Reinforcing member 14 can be foraminous, having an open area sufficient to allow fluid, such as air or water to pass through during a papermaking or nonwoven making operation. The reinforcing member can be a film or sheet, such as a perforated polymer film or a perforated metallic sheet. The reinforcing member, as illustrated herein, can also be made of woven filaments 8 as is known in the art of papermaking fabrics. In some non-limiting forms, the woven filaments are made of synthetic fibers, metallic fibers, carbon fibers, silicon carbide fibers, fiberglass, mineral fibers, and/or polymer fibers including polyethylene terephthalate ("PET") or PBT polyester, phenol-formaldehyde (PF); polyvinyl chloride fiber (PVC); polyolefins (PP and PE); acrylic polyesters; aromatic polyamids (aramids) such as Twaron®, Kevlar® and Nomex®; polytetrafluoroethylene such as Teflon® commercially available from DuPont®; polyethylene (PE), including with extremely long chains/HMPE (e.g. Dyneema or Spectra); polyphenylene sulfide ("PPS"); and/or elastomers. In one non-limiting form, the woven filaments of reinforcing member are filaments as disclosed in U.S. Pat. No. 9,453,303 issued Sep. 27, 2016 in the name of Aberg et al. Reinforcing member 14 in some forms may include woven filaments that exhibit a diameter of about 0.20 mm to about 1.2 mm, or about 0.20 mm to about 0.55 mm, or about 0.35 mm to about 0.45 mm. Reinforcing member 14 may be manufactured by traditional weaving processes, or through other processes such as additive manufacturing, e.g., 3-D printing.

The reinforcing member can have an open area sufficient to prevent fibers from being drawn through the deflection member during a dewatering process for papermaking or in a vacuum process for spunbond nonwoven making. As fibers are molded into the voids of deflection member 10 during production of fibrous substrates, reinforcing member 14 can serve as a "backstop" to prevent, or minimize fiber loss through the deflection member. Reinforcing member 14 also provides for fluid permeable structural strength and stability of deflection member 10.

Each tile 24 of patterned framework 12 can have one or more deflection conduits 16, which are the portions of the tile in which a fibrous structure can be molded threedimensionally, and include voids, i.e., openings, through the tile and, if present, protuberances 18. Protuberances 18 are structures with a Z-directional height above a web side surface 22 of tile 24, as described below. Deflection conduits 16 and protuberances 18 define a three-dimensional profile to tiles 24 that can be imparted to corresponding fibrous structures made on deflection member 10. As discussed more fully below, a plurality of tiles 24 can be fastened onto a reinforcing member in a tessellating pattern such that there is little to no gap between adjacent tiles and no overlap of tiles. In this manner, many relatively small tiles produced in an additive manufacturing process, such as 3-D printing, can be joined to a reinforcing member to achieve a relatively large deflection member, such as a belt of a size sufficient for papermaking or nonwoven making.

The size of the patterned framework 12 in belt form can be determined by the size of corresponding reinforcing member 14 and the number, size and spacing of tiles 24 fastened onto the reinforcing member. In some non-limiting forms, the overall size of tile 24 may be about 1 inch by about 1 inch, about 2 inches by about 2 inches, about 3 inches by about 3 inches, about 4 inches by about 4 inches, about 5 inches by about 5 inches, about 10 inches by about 10 inches, about 11 inches by about 11 inches, about 12 inches by about 12 inches, about 15 inches by about 15 inches, about 18 inches by about 18 inches, about 24 inches by about 24 inches, about 30 inches by about 30 inches, or dimensions within those detailed dimensions. As a non-limiting example, if reinforcing member 14 is 110 inches wide, ten complete 11 inch by 11 inch tiles 24 would evenly fit across the width of reinforcing member 14. As another non-limiting example, if reinforcing member 14 is 110 inches wide, 110 complete 1 inch by 1 inch tiles 24 would evenly fit across the width of reinforcing member 14.

As shown in FIGS. 1 and 2, tile 24 can have a three-dimensional structure determined by the desired three-dimensional structure of the fibrous web made thereon. The structure illustrated in FIGS. 1 and 2, as well as any other descriptions disclosed herein are representative only, with the only limitations being limitations imposed by the methods of making, such as additive manufacturing technology (in which the process allows for positive and/or negative angles and/or radii of curvature for surface elements such as deflection conduits or protuberances). In general, a tile can have relatively large edge dimensions measured in the MD and CD plane, and relatively small dimensions measured in the Z-direction, giving the tile a generally planar macro-form, with backside 20 contacting the reinforcing member when fastened thereto, and web side 22 that is web-contacting when used to make a fibrous web. Backside 20 can be generally in a plane that is disposed on the knuckles of a woven fabric of reinforcing member 14, as depicted in FIG. 2, or it can have structure itself if desired.

Figure 3:
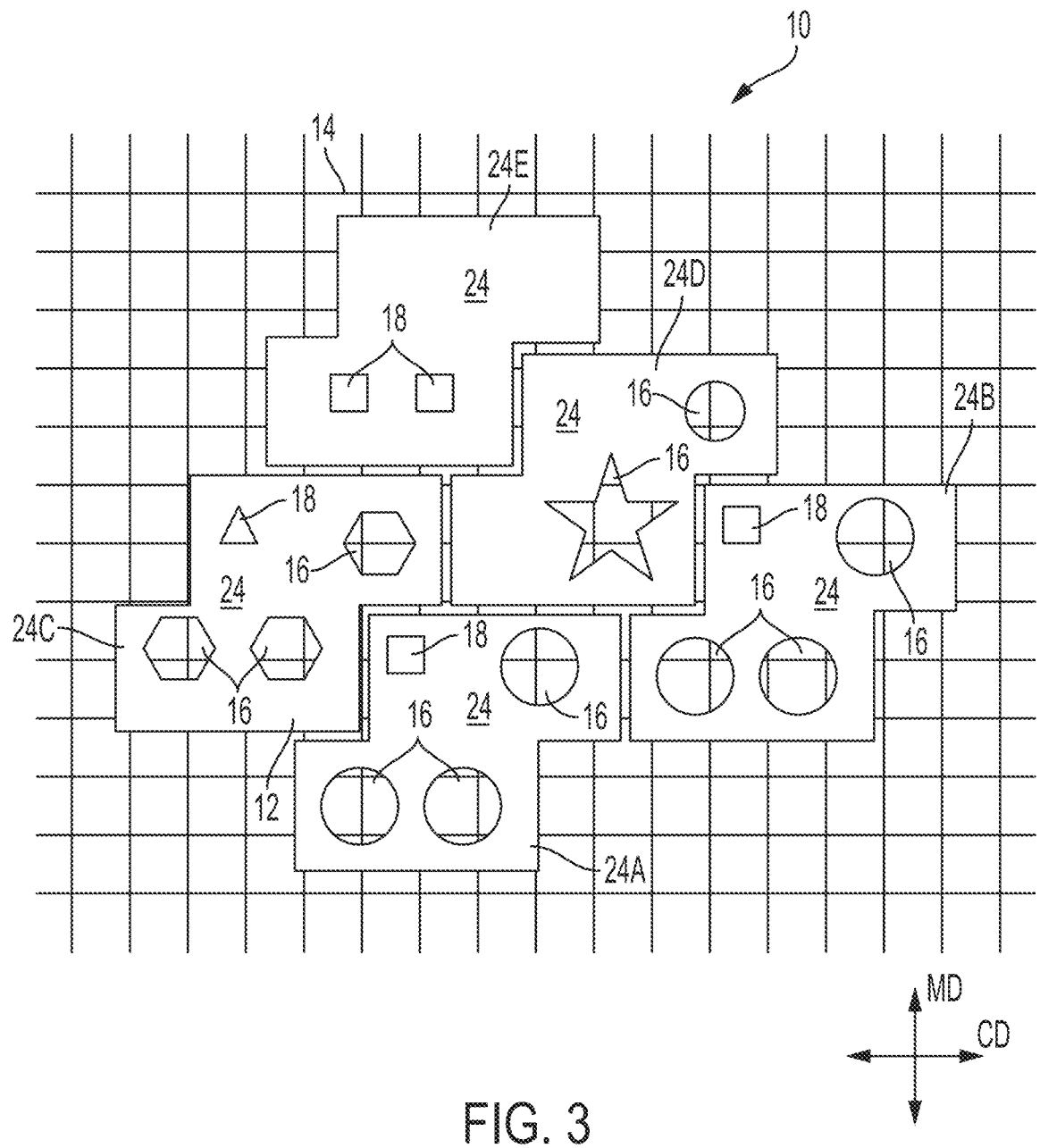
FIG. 3 is a plan view of a form of a deflection member of the present invention.
Figure 8:
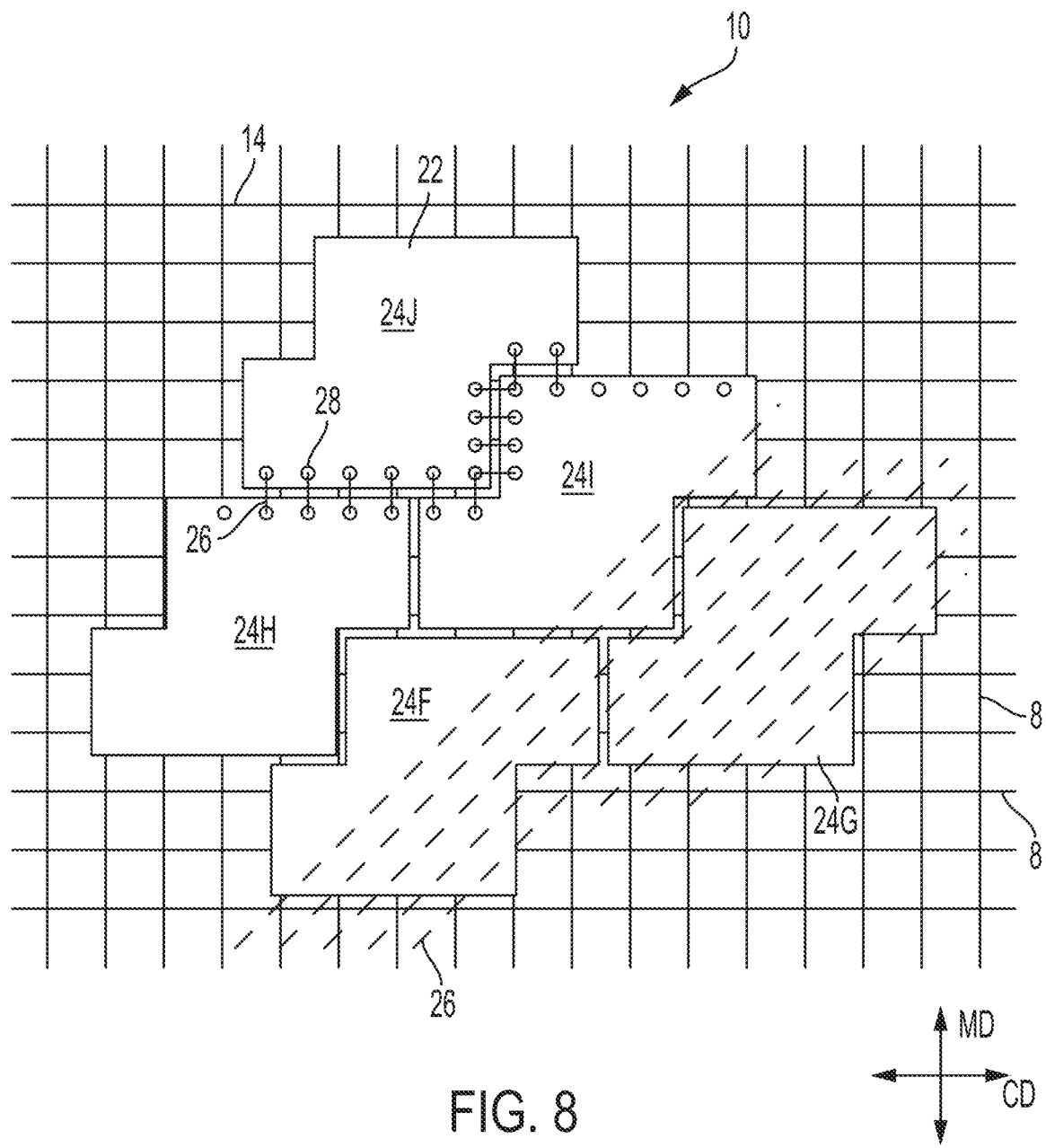
FIG. 8 is a plan view of representative stitching patterns on a deflection member of the present invention.
Figure 9:
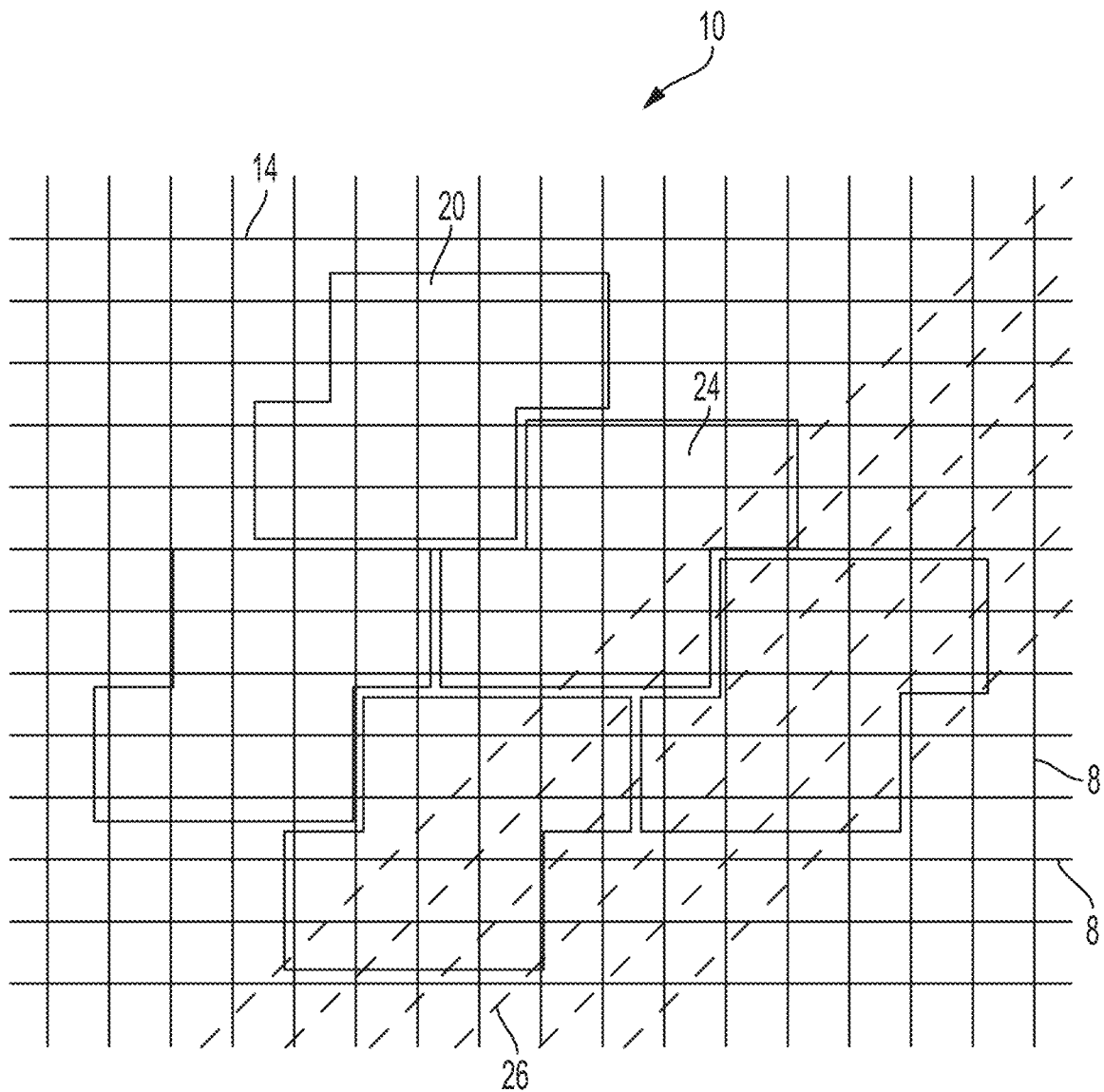
FIG. 9 is a plan view of representative stitching patterns on a deflection member of the present invention.

Tile 24 is shown in FIG. 1 as generally square, but the shape of the tile can be any shape desired, with particular benefits of pattern uniformity being achieved when the shape permits a tessellating pattern, such that there is little to no gap and no overlap between adjacent tiles. In some forms of deflection member 10, multiple tiles 24 are fastened to reinforcing member 14 in a tessellating pattern, and each tile has the shape of a polygon with at least 3 sides, at least 4 sides, at least 5 sides, at least 6 sides, at least 7 sides, at least 8 sides, at least 9 sides, or at least 10 sides, to form patterned framework 12. In some forms of deflection member 10, multiple tiles 24 are fastened to reinforcing member 14 in a tessellating pattern and each tile has the shape of a polygon with between 3 and 10 sides, between 4 and 10 sides, between 5 and 10 sides, between 6 and 10 sides, between 7 and 10 sides, or between 8 and 10 sides, to form patterned framework 12. In some forms of deflection member 10, as seen in FIGS. 3, 8 and 9, multiple tiles 24 form patterned framework 12, and the tiles may be formed in the same overall shape and size (e.g., the same overall sized, irregular octagons depicted in FIGS. 3, 8 and 9).

If creating patterned framework 12 that only consists of a single shape of tile 24 (i.e., all the tiles in the patterned framework are the same shape and size for simplicity and efficiency), the tiles may be formed in a single tessellating shape (i.e., one tile shape that when used in a plurality, can form a tessellating pattern). Tessellating shapes include triangles, squares, hexagons and irregular pentagons. In some forms of deflection member 10, multiple tiles 24 form patterned framework 12 in a tessellating manner, and the tiles may be formed in more than one shape and/or size (a first shape and a second shape, and optionally a third shape, etc.). For instance, patterned framework 12 may be tessellating and include tiles that are all formed square in shape, but formed in multiple sizes (a first size and a second size). In another example, patterned framework 12 may be tessellating and may include tiles that are formed in the shape of a square (i.e., a first shape), a hexagon (i.e., a second shape), and a triangle (i.e., a third shape). In some instances, patterned framework 12 may be tessellating and include tiles in one or more irregular, non-geometric shapes.

Tiles 24 may be fastened to reinforcing member 14 in a tessellating pattern in any orientation. In some forms, tiles 24 or rows of tiles that form patterned framework 12 can be oriented in either the MD or the CD when fastened to reinforcing member 14. In other forms, tiles 24 and/or rows of tiles that form patterned framework 12 can be oriented in a direction that is diagonal to either the MD or the CD when fastened to reinforcing member 14. In such forms with diagonally oriented tiles 24 or rows of tiles, when deflection member 10 travels around deflection points in a conveyor system, a peak or corner of the tile first deflects (in lieu of a side of the tile first hitting the deflection point), then followed by deflection of the rest of the tile, thus limiting the initial stress caused to the tile points of fastening to reinforcing member 14.

Tiles 24 may be made from a single material, a variety of materials or combination of materials, the particular material(s) determined by the desired structural properties of the deflection member, such as strength and flexibility required for the fibrous structure making process, including deflection when operating on the conveyor system. Tiles 24 can be molded, such as by injection molding, and can be made of polymeric material including thermoplastic and thermoset materials. Tiles 24 can also be manufactured by additive manufacturing, and the choice of materials is determined by the additive manufacturing technology used to form it. Tiles 24 may each be manufactured as a single, complete unit (e.g., unitary 3-D printed tiles), or in some forms may be manufactured from multiple parts, such as 3-D printed portions that are printed onto previously manufactured portions. In some forms of deflection member 10, tile 24 is manufactured by 3-D printing a material, such as resin, onto a separate base material, i.e., an intermediate layer such as a premade section of woven fibers, with the combination of the intermediate layer and the printed material forming the tile as detailed herein. In such forms, the intermediate layer of tile 24 may then be utilized to fasten the tile to reinforcing member 14 through any of the methods detailed herein. This multi-part form of tile 24 allows for tile(s) with a discrete knuckle pattern (for example, as detailed in US Patent Publication No. 2015/0247291, published Sep. 3, 2015 in the name of Maladen et al.) to be fastened to reinforcing member 14 as detailed herein.

In some forms, tiles 24 can be made from metal, metal-impregnated resin, silica glass beads, polymer resin, plastic, crosslinked polymer, photopolymer, fluoropolymers, UV curable polymer, photosensitive polyurethane, rubber, thermoplastics, thermoplastic elastomers, thermoset resins, silicone or any combination thereof. Additional and/or specific materials that are also considered herein for construction of tile 24 include materials disclosed in US Patent Publication Nos. 2017/096,547; 2016/0340,506; 2016/009,003; 2017/005,1455; 2016/0185,050; 2007/0170,610; and 2005/0280,184; or disclosed in U.S. Pat. No. 8,216,427, issued Jul. 10, 2012 in the name of Kierelid et al. In some forms, the resulting deflection member 10 is sufficiently strong and/or flexible to be utilized as a paper making or nonwoven making belt, or a portion thereof, in a batch process or in commercial paper making or nonwoven making equipment.

Each tile 24, and therefore the patterned framework 12, has a backside 20 and a web side 22. In a fibrous web making process, web side 22 is the side of the patterned framework 12 on which fibers, such as papermaking fibers or spunbond fibers/meltblown fibers, are deposited. As defined herein, backside 20 of patterned framework 12 forms an X-Y plane, where X and Y can correspond generally to the CD and MD, respectively, when in the context of using deflection member 10 to make paper in a commercial papermaking process. One skilled in the art will appreciate that the symbols "X," "Y," and "Z" designate a system of Cartesian coordinates, wherein mutually perpendicular "X" and "Y" define a reference plane formed by backside 20 of patterned framework 12 when disposed on a flat surface, and "Z" defines a direction perpendicular to the X-Y plane. The person skilled in the art will appreciate that the use of the term "plane" does not require absolute flatness or smoothness of any portion or feature described as planar.

As used herein, the term "Z-direction" designates any direction perpendicular to the X-Y plane. Analogously, the term "Z-dimension" means a dimension, distance, or parameter measured parallel to the Z-direction and can be used to refer to dimensions such as the height of protuberances, or the thickness or caliper of deflection member 10. It should be carefully noted, however, that an element that "extends" in the Z-direction does not need itself to be oriented strictly parallel to the Z-direction; the term "extends in the Z-direction" in this context merely indicates that the element extends in a direction which is not parallel to the X-Y plane. Analogously, an element that "extends in a direction parallel to the X-Y plane" does not need, as a whole, to be parallel to the X-Y plane; such an element can be oriented in the direction that is not parallel to the Z-direction.

One skilled in the art will also appreciate that deflection member 10 as a whole does not need to (and indeed cannot in some forms) have a planar configuration throughout its length, especially if sized for use in a commercial process for making a fibrous structure, and in the form of a flexible member or belt that travels through processing equipment that can include deflections around rollers, turning bars and the like. The concept of deflection member 10 being disposed on a flat surface and having the macroscopical "X-Y" plane is conventionally used herein for the purpose of describing relative geometry of several elements of deflection member 10 which can be generally flexible. A person skilled in the art will appreciate that when deflection member 10 curves or otherwise deplanes, the X-Y plane follows the configuration of the deflection member.

As used herein, the terms containing "macroscopical" or "macroscopically" refer to an overall geometry of a structure under consideration when it is placed in a two-dimensional configuration. In contrast, "microscopical" or "microscopically" refer to relatively small details of the structure under consideration, without regard to its overall geometry. For example, in the context of deflection member 10, the term "macroscopically planar" means that the deflection member, when it is placed in a two-dimensional configuration, has—as a whole—only minor deviations from absolute planarity, and the deviations do not adversely affect the deflection member's performance. At the same time, patterned framework 12 of deflection member 10 can have a microscopical three-dimensional pattern of deflection conduits and protuberances, as will be described below.

There are virtually an infinite number of shapes, sizes, spacing and orientations that may be chosen for protuberances 18 and voids that define the deflection conduits 16. The actual shapes, sizes, orientations, and spacing can be specified and manufactured by additive manufacturing processes based on the desired design of the end product. Some exemplary protuberances 18 and/or voids for forms of deflection member 10 disclosed herein are found in U.S. Pat. No. 5,895,623, issued Apr. 20, 1999 to Trokhan et al.; U.S. Pat. No. 5,948,210, issued Sep. 7, 1999 to Huston; U.S. Pat. No. 5,900,122, issued May 4, 1999 to Huston; U.S. Pat. No. 5,893,965, issued Apr. 13, 1999 to Trokhan et al.; U.S. Pat. No. 5,906,710, issued May 25, 1999 to Trokhan; U.S. Pat. No. 6,171,447, issued Jan. 9, 2001 to Trokhan; U.S. Pat. No. 6,358,030, issued Mar. 20, 2002 to Ampulski; U.S. Pat. No. 6,576,091, issued Jun. 10, 2003 to Cabell et al.; U.S. Pat. No. 6,913,859, issued Jul. 5, 2005 to Hill et al.; U.S. Pat. No. 6,743,571, issued Jun. 1, 2004 to Hill et al.; U.S. Pat. No. 7,914,649, issued Mar. 29, 2011 to Ostendorf et al.; U.S. Pat. No. 6,660,362, issued Dec. 9, 2003 to Lindsay et al.; and U.S. Pat. No. 6,610,173, issued Aug. 26, 2003 to Lindsay et al.

FIG. 3 depicts a representative example of a plurality of tiles 24 fastened to reinforcing member 14 in a tessellating pattern with little or no gap between adjacent tiles to form a patterned framework 12. In forms of deflection member 10 that include patterned framework 12 with no gap between adjacent tiles 24, at least one perimeter edge of every tile contacts at least one perimeter edge of another tile in the patterned framework. In some forms in which a gap exists between adjacent tiles 24, the gap may be less than about 5 mm, less than about 4 mm, less than about 3 mm, less than about 2 mm, less than about 1 mm, less than about 0.75 mm, less than about 0.5 mm, less than about 0.25 mm, less than about 0.1 mm, less than about 0.05 mm, less than about 0.03 mm, or less than about 0.01 mm. For additional clarity, any gaps shown in the drawings are not necessarily drawn to scale. Tiles 24 in FIG. 3 can be fastened to reinforcing member 14 by any method detailed herein, but the particular fasteners are not shown for simplicity and clarity in FIG. 3. As shown in FIG. 3, adjacent tiles 24 may have identically sized, shaped and spaced openings of deflection conduits 16 defined by identically sized and spaced voids and protuberances, as depicted in tiles 24A and 24B. Adjacent tiles may also have differently sized, shaped, and/or spaced openings of deflection conduits 16 defined by voids and protuberances 18, as depicted by adjacent tiles 24A and 24C. Tiles 24 may have only voids defining deflection conduits 16, as depicted in tile 24D, and the voids in any given tile need not be the same size or shape. In some forms of patterned framework 12, certain tiles 24 may have only protuberances 18, as depicted in tile 24E. In general, each tile 24 can be identical to adjacent tiles, or adjacent tiles can be different. In this manner, a patterned framework 12 can be tailored for specific shapes of deflection conduits and air permeability across the area of deflection member 10. In some forms of deflection member 10, the patterned framework 12 may include one or more individual tiles 24 (or groupings of tiles) that include deflection conduit(s) 16 and/or protuberance(s) 18 that are arranged in a pattern to provide a product identifier, product name or logo on the produced fibrous structures.

Figure 4:
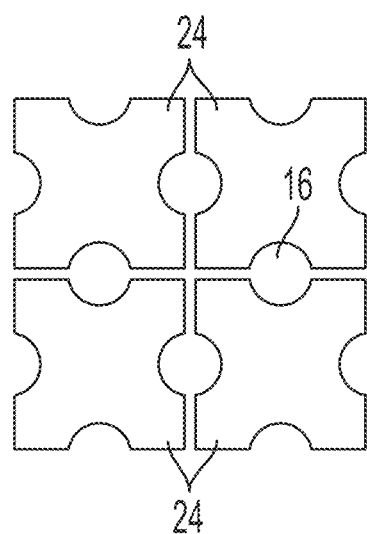
FIG. 4 is a plan view of a form of tiles of a deflection member of the present invention.

In some forms, deflection conduits 16 and/or protuberances 18 can be in whole or in part defined by the edge characteristics of two or more adjacent tiles. For example, as shown in FIG. 4, in which reinforcing member 10 and fastening elements 26 are not shown for clarity, edges of tiles 24 can have features that define a void of a deflection conduit 16 (i.e., a first deflection conduit) that when paired with an adjacent tile 24 which can have a correspondingly identical edge feature (i.e., a second deflection conduit), form a combined deflection conduit, or not. In some forms, these combined deflection conduits formed by the combination of deflection conduits on multiple adjacent tiles are the same, or very similar, to other deflection conduits 16 (as described herein) formed within a single tile. Thus, when tiled in a pattern that can be a tessellating pattern, deflection conduits 16 can be defined by the combination of edge effects of adjacent tiles. In the form illustrated in FIG. 4, the pair of adjacent tiles each have a portion of a deflection conduit in the shape of a half circle at the tile edge, thus when put together and lined up, the adjacent tiles form an entire deflection conduit 16 in the shape of a circle.

Figure 5:
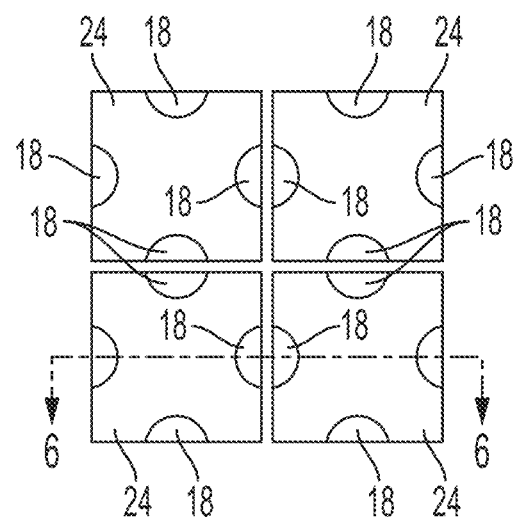
FIG. 5 is a plan view of a form of tiles of a deflection member of the present invention.
Figure 6:
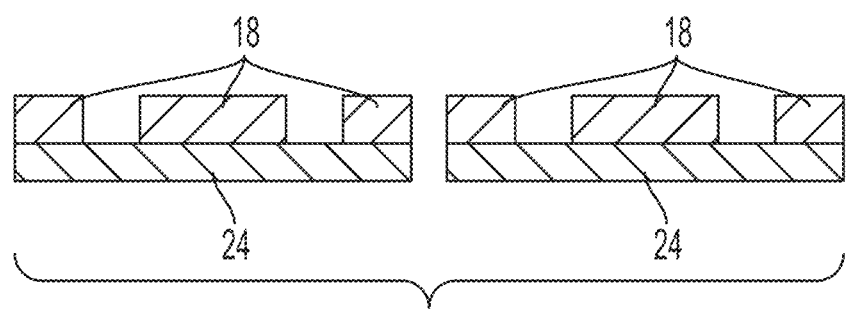
FIG. 6 is a cross-sectional view of the tiles of the deflection member shown in FIG. 5, taken along lines 6-6 of FIG. 5.

As another example, as shown in FIGS. 5 and 6, in which reinforcing member 10 and fastening elements 26 are not shown for clarity, edges of tiles 24 can have features that define a protuberance 18 (i.e., a first protuberance) that when paired with an adjacent tile 24 which can have a correspondingly identical edge feature (i.e., a second protuberance), form a combined protuberance, or not. In some forms, these combined protuberances formed by the combination of protuberances on multiple adjacent tiles are the same, or very similar, to other protuberances 16 (as described herein) formed upon a single tile. Thus, when tiled in a pattern that can be a tessellating pattern, protuberances 18 can be defined by the combination of edge effects of adjacent tiles. In the form illustrated in FIGS. 5 and 6, the pair of adjacent tiles each have a portion of a protuberance in the shape of a half circle at the tile edge, thus when put together and lined up, the adjacent tiles form an entire protuberance 18 in the shape of a circle. In some forms of deflection conduit 10 tiled in a pattern that can be a tessellating pattern, both deflection conduits 16 and protuberances 18 can be defined by the combination of edge effects of adjacent tiles.

Tile 24 can have a specific resulting open area R. As used herein, the term "specific resulting open area" (R) means a ratio of a cumulative projected open area ($\Sigma R$) of all deflection conduits 16 of a given unit of the deflection member's surface area (A) to that given surface area (A) of this unit, i.e., $R=\Sigma R/A$, wherein the projected open area of each individual conduit is formed by a smallest projected open area of such a conduit as measured in a plane parallel to the X-Y plane. The specific open area can be expressed as a fraction or as a percentage. For example, if a hypothetical layer has two thousand individual deflection conduits dispersed throughout a unit surface area (A) of thirty-thousand square millimeters, and each deflection conduit has the projected open area of five square millimeters, the cumulative projected open area ($\Sigma R$) of all two thousand deflection conduits is ten thousand square millimeters, (5 sq. mm×2.000=10,000 sq. mm), and the specific resulting open area of such a hypothetical layer is $R=\frac{1}{3}$, or 33.33% (ten thousand square millimeters divided by thirty thousand square millimeters).

The cumulative projected open area of each individual conduit is measured based on its smallest projected open area parallel to the X-Y plane, because some deflection conduits may be non-uniform throughout their length, or thickness of the deflection member. For example, some deflection conduits may be tapered as described in commonly assigned U.S. Pat. No. 5,900,122 issued May 4, 1999 in the name of Huston; and U.S. Pat. No. 5,948,210 issued Sep. 7, 1999 in the name of Huston. In other forms of the deflection member disclosed herein, the smallest open area of the individual conduit may be located intermediate the top surface and the bottom surface of the deflection member.

The specific resulting open area of the deflection member can be at least about $\frac{1}{5}$ (or 20%), or at least about $\frac{2}{5}$ (or 40%), or at least about $\frac{3}{5}$ (or 60%) or at least about $\frac{4}{5}$ (or 80%) or at least about $\frac{9}{10}$ (or 90%), or at least about $\frac{19}{20}$ (or 95%), or from about 35% to about 98%. According to the present invention, the first specific resulting open area R1 may be greater than, substantially equal to, or less than the second resulting open area R2.

Figure 7:
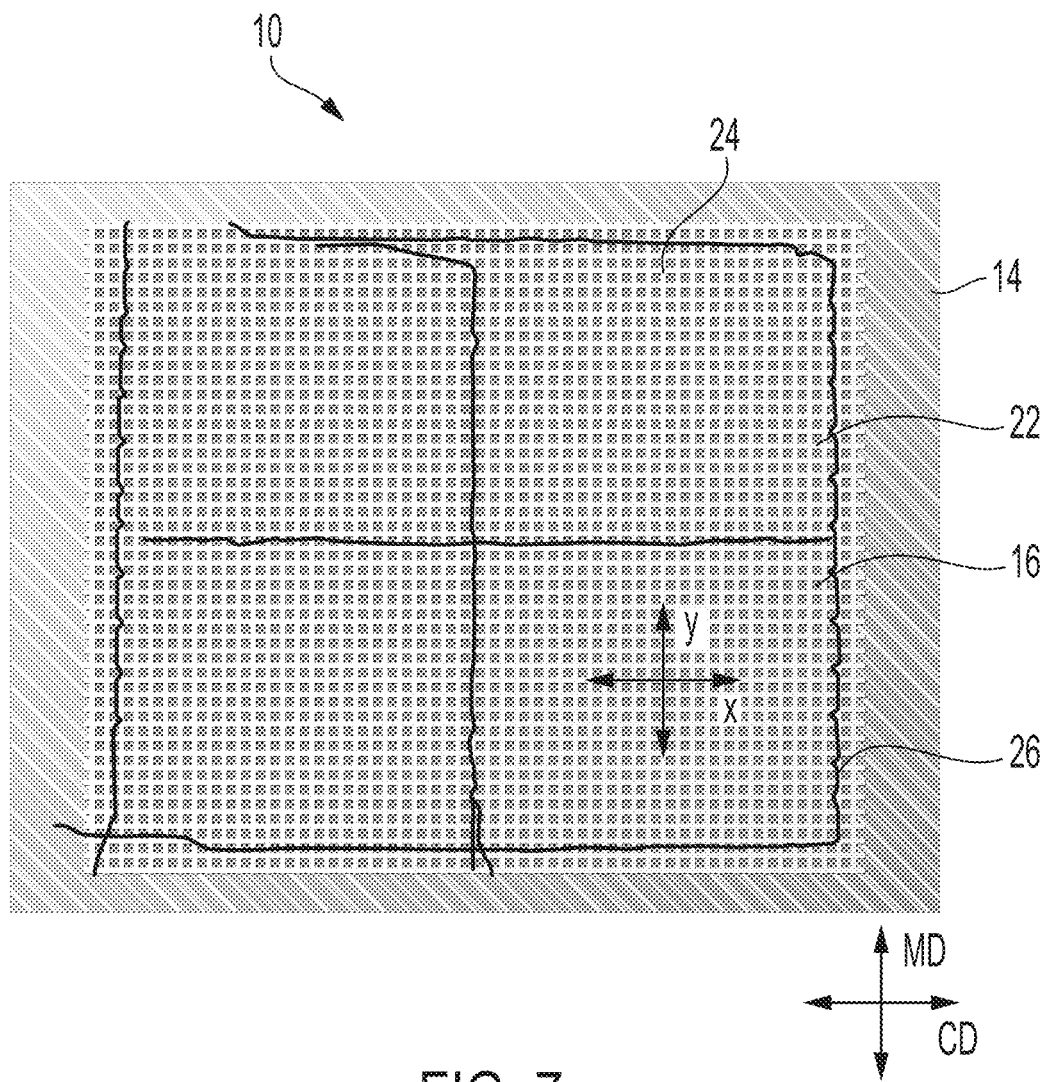
FIG. 7 is a photograph of a form of a deflection member of the present invention.

Process for Making Deflection Member:

Tile 24, as shown in FIG. 7, was made by a 3-D printer utilized as the additive manufacturing making apparatus, specifically an Objet 30 Prime®, available from Stratasys Corp.®, Eden Prairie, Minn., USA. Other alternative methods of additive manufacturing include, but are not limited to, selective laser sintering (SLS) and direct metal laser sintering for powder bed fusion; continuous liquid interface production (CLIP) and stereolithography (SLA) for vat photo-polymerization; film transfer imaging (FTI); Polyjet, Objet, Connex, Multijet, Projet or Direct Write for material jetting; ProMetal/XOne, Voxeljet, ZCorp for binder jetting; laser engineered net shaping (LENS) for directed energy deposition; ultrasonic consolidation (UC) or Fabrisonic for sheet lamination; or fused deposition modeling (FDM, as marketed by Stratasys Corp., Eden Prairie, Minn.), also known as fused filament fabrication (FFF) or plastic jet printing (PJP, as marketed by 3D Systems, Rock Hill, S.C.); or hybrid approaches such as Syringe Delivery System (SDS) using material extrusion and thermal- or light-induced polymerization; or any other known additive manufacturing process.

Tile 24, as shown in FIG. 7, was made from an ultraviolet (UV) light curable photopolymer from Stratasys Corp.®— Endur RGD450 and accompanying support material SUP705. The tile was created by rendering 2-D sketches of each repeat element in SolidWorks 2014×64 SP4.0. In this case, two repeat elements are used in the tile, one parallel to the x-axis and a second parallel to the y-axis—0.3 mm in either the respective x- or y-directions and each 0.56 mm in the z-direction. The 2-D images were rendered as 3-D by using the Boss Extrude feature to a length of 124 mm. The 3-D repeat element parallel to the x-axis was repeated in the y-direction and spaced equally by 1.3 mm to enable 96 elements in a distance of 124 mm. The 3-D repeat element parallel to the y-axis was repeated in the x-direction and spaced equally to enable 96 elements in a distance of 124 mm. Mate surfaces were defined such that the top surfaces of each 3-D repeat element were at the same elevation. The assembly was saved as binary standard tessellation language (STL) file and printed using an Objet 30 Prime 3-D printer. The STL file was prepared for printing by opening in Objet Studio and oriented on the virtual build platform. Objet Studio sliced the parts prior to printing on the build platform. Print duration ranged from 52 to 64 seconds consuming 22 g of model material and 81 g of support material. After printing, the solid part was removed from the actual build platform using a spatula. Support material was washed away using a high pressure washing system (model OBJ-03US). The tile was dried of residual water at ambient conditions. As further detailed below, the tile was stitched onto a woven filament reinforcing member along each edge and in a manner to bisect the width and length.

Tile Fastening to Reinforcing Member:

The fastening element 26 used to join tiles 24 to reinforcing member 14 can be made from any material sufficiently flexible and strong enough to ensure that the tiles do not become enjoined from the reinforcing member during the production process for a fibrous web. The type and/or source material(s) of fastening element 26 can be selected to withstand processing requirements, including pressure and temperature extremes associated with nonwoven and papermaking processes. Each of the following detailed types of fastening, and any of the various combinations thereof, may be used to fasten tile 24 (or patterned framework 12 comprising one or more tiles) to reinforcing member 14.

Stitching:

In one form of deflection member 10, tile 24 can be fastened to reinforcing member 14 by stitching and/or tying the tile onto the reinforcing member. When fastening is attained by stitching, fastening element 26 can be a thread made of natural and/or synthetic fiber(s) including, but not limited to, cotton, hair, silk; metallic fiber(s); carbon fiber(s); silicon carbide fiber(s); fiberglass; mineral fiber(s); and polymer fiber(s) including PET or PBT polyester, phenol-formaldehyde (PF); polyvinyl chloride fiber (PVC); polyolefins (PP and PE); acrylic polyesters; aromatic polyamids (aramids) such as Twaron, Kevlar and Nomex; polyethylene (PE), including with extremely long chains/HMPE (e.g. Dyneema or Spectra); polyether ether ketone ("PEEK"); polyphenylene sulfide ("PPS"); and elastomers. Fastening element 26 may also be coated to reduce or prevent water intrusion and/or to give the fastening element greater flame retardancy. In one form of deflection member 10, reinforcing member 14 is constructed of woven filaments, and the thread used to stitch tile 24 to the reinforcing member is the same type of filament that is used to construct the reinforcing member 14.

As seen in FIGS. 1, 2 and 8, thread openings 28 on tile 24, which can be pre-formed holes, permit fastening element 26 to be stitched through and onto reinforcing member 14. In general, however, it is not necessary that thread openings 28 exist prior to a stitching process; thread openings 28 can be formed during the stitching process. Accordingly, in another form of deflection member 10, no holes are provided on tile 24, but stitching is achieved by piercing a hole in tile 24 during the stitching operation. Stitching can be accomplished with needle and thread and can be achieved by hand or by sewing machine by methods known in the art. In some forms, the sewing may be controlled by machine vision to enable utilization of thread openings 28. In some forms, a channel may exist in an area of tile 24 where stitching is to be located. Such channel may or may not contain preformed holes 28. The channel allows the thread of the stitches to sit even with, or below the web side surface 22 of tile 24, keeping the stitches from wearing prematurely in the nonwoven or papermaking process and/or minimizing the appearance of the stitches in the nonwoven and paper products produced on deflection member 10.

When stitching tile 24 to reinforcing member 14 through utilization of a needle, fastening element 26 is threaded through thread opening 28 in the tile (or the needle pierces a hole if there is no pre-existing thread opening), and then threaded through an opening in reinforcing member 14 (or the needle pierces a hole if there is no pre-existing opening at that location in the reinforcing member). Fastening element 26 is then pulled partially through the openings in the tile and reinforcing member. The fastening element 26 is then threaded through an adjacent opening in reinforcing member 14 (or the needle pierces an adjacent hole if there is no pre-existing opening at that location in the reinforcing member), and then threaded through an adjacent thread opening 28 in the tile (or the needle pierces a hole if there is no adjacent pre-existing thread opening). Each time these steps are performed, the process will result in a stitch. This process may be continued by hand or sewing machine until tile 24 is fastened to reinforcing member 14 in a desirable manner for a particular application of deflection member 10. As illustrated in FIGS. 1 and 2, this process may be continued to create a deflection member 10 with a row of stitches around the perimeter of tile 24. In some forms, the stitches may also be disposed inside of the outer perimeter of tile 24. In some forms, the stitching process is not continuous, and fastening is achieved by unitizing stitches of thread (or a loop of thread with a knot) in one or more discrete locations.

The fastening of tiles 24 to a reinforcing member 14 can be achieved by stitching in various ways. In addition to stitching by tying or sewing with thread or filaments around the perimeter of each tile, as shown in FIG. 1, joining can be achieved by stitching adjacent tiles 24 across their mutual boundary, as shown in FIG. 8, which illustrates threads 26 joining adjacent tiles 24H, 24I and 24J through thread openings 28 along representative adjoining sides to each other and/or reinforcing member 14 below. Of course, the joining can be to all adjacent sides, but only three are shown in FIG. 8 for simplicity and clarity. As with the general disclosure above, it is not necessary that thread openings 28 exist as holes prior to a stitching process; the thread openings can be formed during the stitching process.

Likewise, as shown in FIG. 8, stitching can be achieved to form deflection member 10 by stitching rows of fastening element 26 threads across web side surface 22 of tiles 24 without regard for tile shape, as shown partially covering tiles 24F, 24G, and 24I. Rows of stitching can be spaced and oriented with respect to the MD and CD appropriately, depending on the size and shape of tiles and the open area of reinforcing member 14 so that sufficient joining is achieved depending on the requirements of the fibrous structure making process. The rows can be parallel or non-parallel, and they can be curvilinear or straight. The rows may be oriented in the X-direction, the Y-direction, or between the X and Y directions, for example, on a diagonal to either the X-direction or the Y-direction. Rows of stitching may also be oriented in multiple directions, and may fail to intersect with one another in, for example, a zig-zag pattern, or may intersect with each other in, for example, a cross-hatching pattern.

As a variant to the form shown in FIG. 8, in which stitching is shown as being accomplished on web side surface 22 of the deflection member 10 (i.e., first point of entry of needle/thread is through the web side surface of deflection member), stitching can also be accomplished from back side 20 of the deflection member 10, as shown in FIG. 9 (i.e., first point of entry of needle/thread is through the back side of deflection member). As with the general description of stitching in rows as shown in FIG. 8, the stitching on back side 20, as shown in FIG. 9, can be in rows that are parallel or non-parallel, straight, or curvilinear, the rows being appropriately spaced to adequately join tiles 24 to reinforcing member 14 for their intended purpose. The rows may be oriented in the X-direction, the Y-direction, or between the X and Y directions, for example, on a diagonal to either the X-direction or the Y-direction. Rows of stitching may also be oriented in multiple directions, and may fail to intersect with one another in, for example, a zig-zag pattern, or may intersect with each other in, for example, a cross-hatching pattern.

In another form of deflection member 10 detailed herein, tiles 24 can be pre joined together to make a multi-tile grouping (e.g., patterned framework 12) prior to being stitched onto reinforcing member 14. For example, tiles 24 can be joined with stitching across their mutual boundary, as shown in FIG. 8, but in the absence of a reinforcing member, and then stitched as a multi-tile grouping to reinforcing member 14, for example, with rows of stitching across the patterned framework like shown in FIGS. 8 and 9. As another example, tiles 24 can be joined with stitching across their mutual boundary, as shown in FIG. 8, but in the absence of a reinforcing member, and then stitched as a multi-tile grouping to reinforcing member 14, for example, with rows of stitching along the perimeter of the overall patterned framework like shown in FIGS. 1 and 2. As another example, tiles 24 can be joined with stitching across their mutual boundary, as shown in FIG. 8, but in the absence of a reinforcing member, and then stitched as a multi-tile grouping to reinforcing member 14, for example, with rows of stitching both across the patterned framework like shown in FIGS. 8 and 9, and along the perimeter of the overall patterned framework like shown in FIGS. 1 and 2. In this manner, relatively large areas of tiles 24 can be prepared ahead of time, and stitched into place on reinforcing member 14 without the risk of adjacent tiles moving and being stitched in a misplaced position.

FIG. 7 is a photograph of a tile 24 stitched with fastening element 26 to reinforcing member 14, which is a woven papermaking fabric. Tile 24 was made by an additive manufacturing process in a simple grid pattern of generally square deflection conduits 16, and stitched onto a papermaking fabric comprising a weave of polymer filaments. The stitching was accomplished by use of a sewing machine with cotton thread from web side surface 22 of deflection member 10. Deflection member 10 could have a larger patterned framework by stitching more tiles 24 onto reinforcing member 14 such that more of the area of the reinforcing member 14 is covered by tiles 24 up to and including a point where the entire area of the reinforcing member is covered in tiles. In such a form, the tiles of the larger patterned framework could be first fastened to each other as detailed above, and then fastened to reinforcing member 14 as a group, or the tiles of the larger patterned framework could be fastened to reinforcing member 14 individually.

In some forms, the detail of the stitching thread that is used to fasten tile 24 to reinforcing member 14 may be visible on the fibrous paper products/nonwoven products produced on deflection member 10.

Riveting

In another form of deflection member 10, tile 24 can be fastened to reinforcing member 14 by riveting the tile onto the reinforcing member. When fastening is attained by riveting, fastening element 26A can be a rivet made from metal, ferrous materials, metal-impregnated resins, ferrous-impregnated resins, plastics, crosslinked polymers, thermoplastics, metal-impregnated thermoplastics, ferrous-impregnated thermoplastics, amorphous thermoplastics, semi-crystalline thermoplastics, crystalline thermoplastics, thermosets, photopolymers, UV curable resins, and combinations thereof. In some forms, rivets 26A can be coated to prevent corrosion, hydrolysis and/or degradation. In one form, rivets 26A that contain ferrous materials may be coated to inhibit corrosion (e.g., rust) in a water intensive papermaking process.

Tile 24 and rivets 26A may be made of the same material, partially from the same material, or from wholly different materials. Further, the material making up rivets 26A on tile 24 may differ from tile to tile in patterned framework 12. In other forms of deflection member 10 disclosed herein, the material making up rivets 26A may be the same, or at least partially the same, from tile to tile in patterned framework 12.

Figure 10:
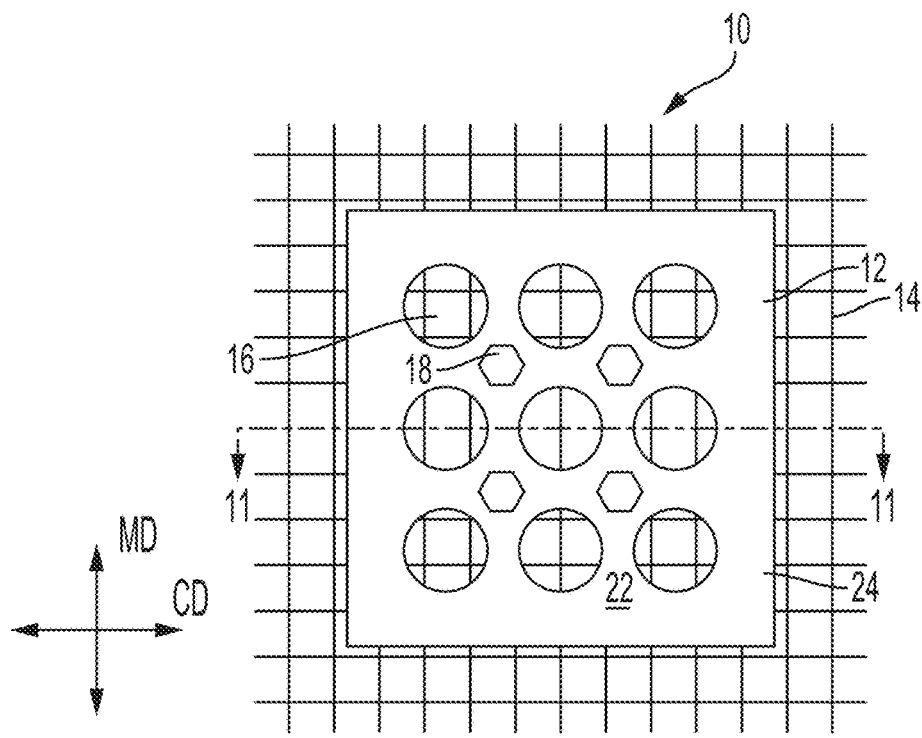
FIG. 10 is a plan view of a form of a deflection member of the present invention.
Figure 11:
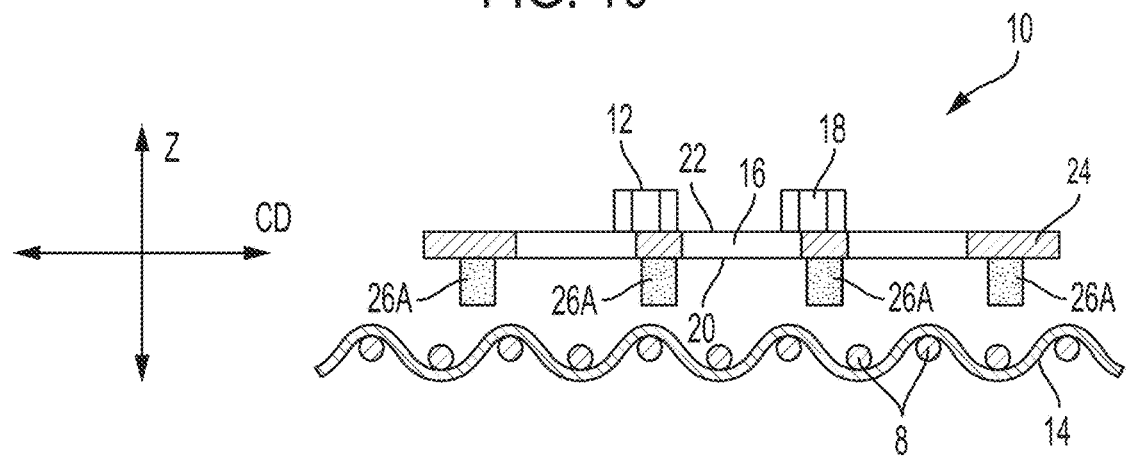
FIG. 11 is a cross-sectional view of the deflection member shown in FIG. 10, taken along lines 11-11 of FIG. 10, before the tile and reinforcing member are brought in contact.
Figure 12:
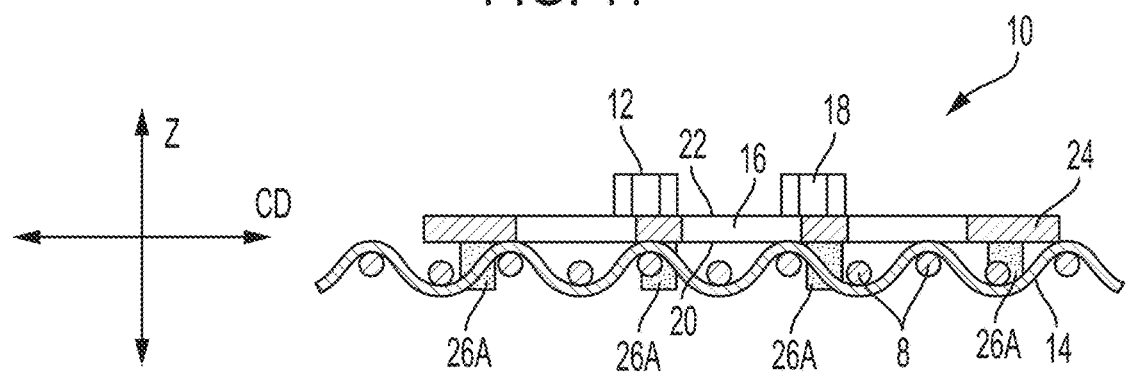
FIG. 12 is a cross-sectional view of the deflection member shown in FIG. 10, taken along lines 11-11 of FIG. 10, after the tile and reinforcing member are brought in contact.

As illustrated in FIGS. 10-12, rivets 26A are disposed on backside 20 of tile 24. If the tile is additively manufactured in a process such as 3-D printing, the rivets can be printed onto the backside of the tile. FIG. 10 illustrates the top side of tile 24, and rivets 26A are on the backside of the tile, and therefore not shown. FIG. 11 illustrates a cross sectional view of FIG. 10, the view taken through line 11-11. In this figure, rivets 26A are visible on backside 20 of tile 24. As further detailed below, during the fastening process, energy is applied to rivets 26A, softening the material of the rivet and allowing the material of the rivet to be pressed through the holes of reinforcing member 14 and/or flow around the filaments of the reinforcing member (when applicable in forms of deflection member 10 that include a woven filament reinforcing member). The pressing of the softened rivet through reinforcing member 14 will deform the original shape of the rivet, forcing the softened material of the rivet through the holes in the reinforcing member. FIG. 12 illustrates tile 24 and reinforcing member 14 after the softened rivets of the tile have been pressed into the holes of the reinforcing member. When the energy dissipates from rivet 26A, the material of the rivet cools and stiffens in a new deformed shape through and around reinforcing member 14 holes, thus fastening tile 24 to the reinforcing member. When rivet 26A is pressed into reinforcing member 14, the material of the rivet may only partially penetrate the thickness of the reinforcing member, or may fully penetrate the thickness of the reinforcing member, as illustrated in FIG. 12.

In one non-limiting form of deflection member 10, as illustrated in FIGS. 10-12, reinforcing member 14 is made of woven filaments 8, and tile 24 is riveted onto the reinforcing member by the softened material of rivets 26A being pressed through the holes in the weave of the reinforcing member. Accordingly, the softened material of rivets 26A is deformed to be pressed through the holes and around woven filaments 8, thus fastening tile 24 to reinforcing member 14 as the material of the rivets cools and stiffens. In alternate forms, wherein the reinforcing member takes the form of a perforated polymer film or a perforated metallic sheet, the softened material of the rivets may be pressed through the holes of reinforcing member.

Rivets 26A can be in any size and or shape that is desirable to support the fastening of tile 24 to reinforcing member 14 in a particular application. In the form of deflection member 10 that is illustrated in FIGS. 10-12, rivets 26A are shaped as rectangular prisms, and are tall enough in the Z-direction (i.e., height of the rivet) to allow the material of the rivet to penetrate the weave of reinforcing member 14. However, other rivet sizes and shapes are also within the scope of this disclosure. For example, in some forms of deflection member 10, rivets may be shaped as cubes, spheres, cylinders, pyramids, pentagonal prisms, hexagonal prisms, heptagonal prisms, octagonal prisms, other various prisms, and combinations thereof. In some forms of deflection member 10, rivets 26A may have a height of about 3 mils to about 100 mils, or about 5 mils to about 50 mils, or about 10 mils to about 40 mils, or about 15 mils to about 30 mils, or about 20 mils to about 25 mils.

Rivets 26A may be disposed on backside 20 of tile 24 in any regular pattern or irregular orientation. If rivets 26A are disposed in rows on the backside of the tile, the rows of rivets can be spaced and oriented with respect to the MD and CD appropriately, depending on the size and shape and open area of tiles, and the open area of the reinforcing member 14, so that sufficient joining is achieved depending on the requirements of the fibrous structure making process. The rows can be parallel or non-parallel, and they can be curvilinear or straight. The rows may be oriented in the X-direction, the Y-direction, or between the X and Y directions, for example, on a diagonal to either the X-direction or the Y-direction. Rows of rivets may also be oriented in multiple directions, and may fail to intersect with one another in, for example, a zig-zag pattern, or may intersect with each other in, for example, a cross-hatching pattern.

The application of energy to soften rivets 26A before/during the fastening process may be by any method known in the art. Non-limiting examples include infrared heating, hot air heating, steam heating, conduction heating, induction heating, and/or combinations thereof. In one form of applying energy to rivets 26A, infrared or hot air heating may be applied to the rivets. If such fastening method is performed in a line process where reinforcing member 14 is located between the infrared or hot air source and the rivets, the energy may travel through the holes in the reinforcing member. Further, if applying infrared or hot air heating, it may be preferable that the rivets are made of a different material than the material that makes up tile 24. If rivets 26A are made of a material that has a lower melting temperature than the material that makes up tile 24, the rivets will be capable of being softened while still maintaining the integrity of the tile for the pressing step detailed below. In another form of applying energy to rivets 26A, induction heating may be applied to the rivets. In such process that includes induction heating, the rivets must contain a ferrous material such as an alloy steel, carbon steel, cast iron, wrought iron, etc. For example, in some forms of deflection member 10, the tile may be made of a UV curable material, and the rivets disposed on backside 20 of the tile may be made of a plastic infused with ferrous particles. If such method is performed in a line process, the induction heating source may be located either above or below the line, as induction heating will create eddy currents that pass through the non-ferrous materials and preferentially heat the ferrous materials. Accordingly, the induction heating source will heat up the ferrous materials within rivets 26A and soften the other surrounding materials (thermoplastic material, etc.) in the rivets that are in close proximity to the ferrous materials.

After rivets 26A have been softened, tile 24 and reinforcing member 14 may be pressed together, thus forcing the softened material of the rivets to deform through the holes of the reinforcing member. Tile 24 and reinforcing member 14 may be pressed together in any type of pressing method/apparatus known in the art. As a non-limiting example, tile 24 and reinforcing member 14 may be pressed together in a line process in between rollers. After pressing, tile 24 (or many tiles in a patterned framework as detailed above) and reinforcing member 14 will form a laminate material, as illustrated in FIG. 12.

In some forms of deflection member 10, rivets 26A may be provided in a form of liquid material that is applied through tile 24 and into reinforcing member 14. The liquid materials that may be used in this process may be plastics, crosslinked polymers, thermoplastics, amorphous thermoplastics, semi-crystalline thermoplastics, crystalline thermoplastics, thermosets, photopolymers, UV curable resins, and combinations thereof. The process may be performed with a similar process as described in US Patent Publication Nos. 2007/170,610 published on Jul. 26, 2007 in the name of Payne et al.; and 2005/280,184 published on Dec. 22, 2005 in the name of Sayers et al.

Adhesive and/or Solvent Welding

Figure 13:
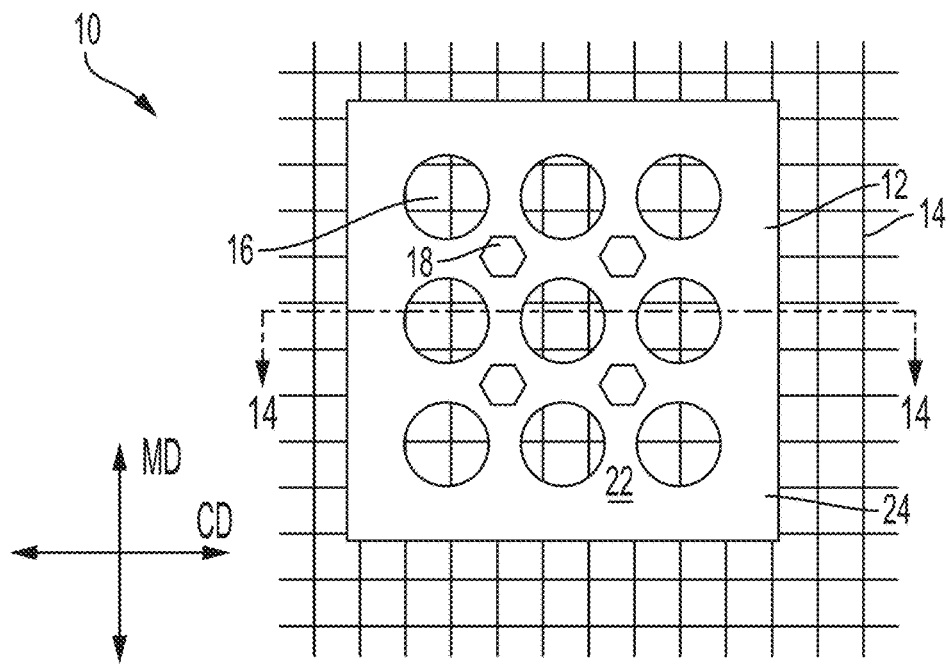
FIG. 13 is a plan view of a form of a deflection member of the present invention.
Figure 14:
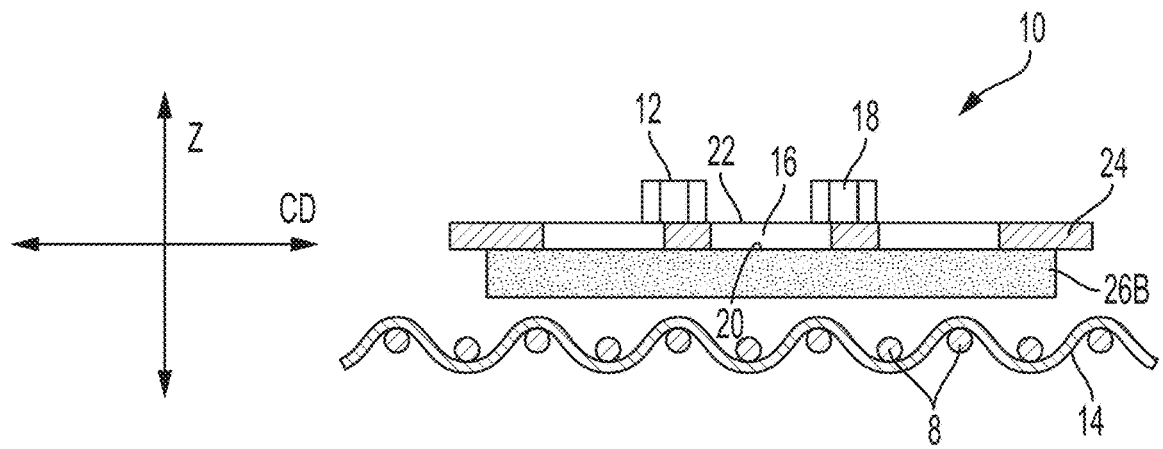
FIG. 14 is a cross-sectional view of the deflection member shown in FIG. 13, taken along lines 14-14 of FIG. 13, before the tile and reinforcing member are brought in contact.
Figure 15:
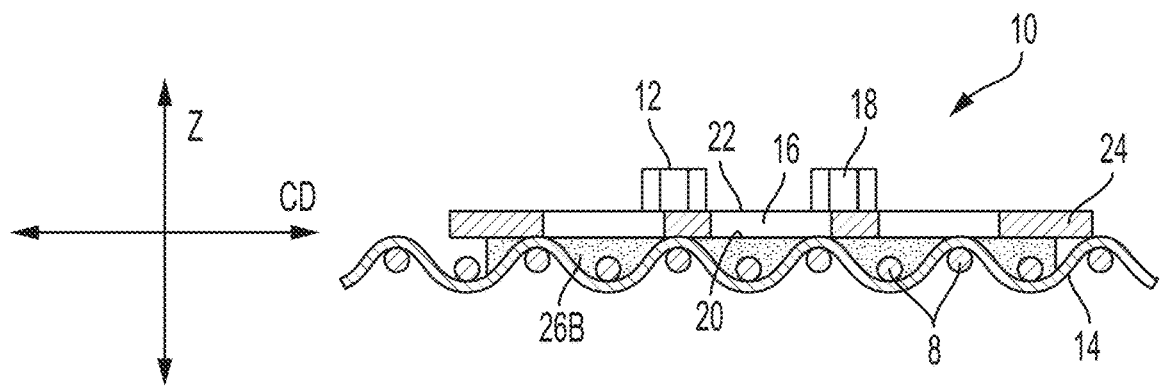
FIG. 15 is a cross-sectional view of the deflection member shown in FIG. 13, taken along lines 14-14 of FIG. 13, after the tile and reinforcing member are brought in contact.

In another form of deflection member 10, as illustrated in FIGS. 13-15, tile 24 can be fastened to reinforcing member 14 by utilizing adhesive to adhere the tile onto the reinforcing member. When fastening with adhesive, fastening element 26B can be an adhesive selected from the group comprising air activated adhesives, light activated adhesives, heat activated adhesives, moisture activated adhesives, and combinations thereof. Possible adhesives include, but are not limited to, adhesives that have low (about 1 to 100 cP at room temperature), medium (101 to 10000 cP at room temperature) and high viscosity (10001 to about 1000000 cP at room temperature) and may exhibit Newtonian or non-Newtonian behavior when deformed prior to curing and may exist as a liquid, gel, paste; epoxies, non-amine epoxy, anhydride-cured epoxy, amine-cured epoxy, high temperature epoxies, modified epoxies, filled epoxies, aluminum filled epoxy, rubber modified epoxies, vinyl epoxies, nitrile epoxy, single and multipart epoxies, phenolics, nitrile phenolics, nitrile phenolic elastomer, nitrile adhesives, modified phenolics, epoxy-phenolics, neoprene phenolics, neoprene phenolic elastomer, second generation acrylics, cyanoacrylates, silicone rubbers, vinyl plastisols, single and multipart polyurethanes, PBI and PI (polyimide) adhesives, acetylenic modified PI, perfluoro-alkylene modified PI, aromatic PI, perfluoro-alkylene modified aromatic PI, epoxy-nylon, polyamides, vinyl-phenolic, polyisocyanates, melamines, melamine formaldehyde, neoprenes, acrylics, modified acrylics, natural rubber (latex), chlorinated natural rubber, reclaimed rubber, styrene-butadiene rubber (SBR), carboxylated styrene butadiene copolymer, styrene butadiene, butadiene-acrylonitrile sulfide, silicone rubber, bitumen, soluble silicates, polyphenylquinoxaline, (solvent adhesive) hexafluoroacetone sesquihydrate (structural adhesive) thermosets: epoxy, polyester with isocyanate curing, styrene-unsaturated polyester, unsaturated polyesters, polyester-polyisocyanates, cyanoacrylate (non-structural adhesive) one component: thermoplastic resins, rubbers, synthetic rubber, phenolic resin and/or elastomers dispersed in solvents; room temperature curing based on thermoplastic resins, rubbers, synthetic rubber, SBR (styrene phenolic resin and/or elastomers dispersed in solvents; elastomeric adhesives, neoprene (polychloroprene) rubber, rubber based adhesives, resorcinol, ethylene vinyl acetate, polyurethane, polyurethane elastomer, polyurethane rubber (bodied solvent cements) epoxies, urethanes, second generation acrylics, vinyls, nitrile-phenolics, solvent type nitrile-phenolic, cyanoacrylates, Polyvinyl acetate, polyacrylate (carboxylic), phenoxy, resorcinol-formaldehyde, urea-formaldehyde, Polyisobutylene rubber, polyisobutyl rubber, polyisobutylene, butyl rubber, nitrile rubber, nitrile rubber phenolic, modified acrylics, cellulose nitrate in solution (household cement), synthetic rubber, thermoplastic resin combined with thermosetting resin, Nylon-phenolic, vulcanizing silicones, room-temperature vulcanizing silicones, hot melts, polyamide hot melts, Epoxy-polyamide, polyamide, epoxy-polysulfide, polysulfides, silicone sealant, silicone elastomers, Anaerobic adhesive, vinyl acetate/vinyl chloride solution adhesives, PMMA, pressure sensitive adhesives, polyphenylene sulfide, Phenolic polyvinyl butyral, furans, furane, phenol-formaldehyde, polyvinyl formal-phenolic, polyvinyl butyral, butadiene nitrile rubber, resorcinol-polyvinyl butyral, urethane elastomers, PVC, polycarbonate copolymer, polycarbonate copolymer with resorcinol, siloxane and/or bisphenol-A, and Flexible epoxy-polyamides. Other possible adhesives include natural adhesives such as casein, natural rubber, latex and gels from fish skins, and adhesives that provide temporary adhesion such as water soluble glues (e.g., Elmer'S® glue and Elmer'S® glue stick). Such temporary adhesion adhesives may be useful in fastening combinations as detailed below.

Adhesive 26B (in one or more layers and/or patterns) can be applied to either backside 20 of tile 24, or to reinforcing member 14, or to both the backside of the tile and the reinforcing member, or as a separate element between the tile and the reinforcing member. In one form of deflection member 10, as illustrated in FIG. 14, adhesive 26B is only applied to tile 24. In another form of deflection member 10, adhesive is only applied to reinforcing member (in forms where reinforcing member 14 is a woven sheet, adhesive may flow around filaments 8 and into the holes of the weave). Total adhesive 26B can be applied in a thickness of about 1 micron to about 2500 microns, or about 1 micron to about 1000 microns, or about 1 micron to about 500 microns, or about 1 micron to about 300 microns, or about 150 microns to about 500 microns, or about 150 microns to about 300 microns.

Adhesive 26B can be applied over the entire tile and/or the reinforcing member, or substantially the entire tile and/or reinforcing member, or in any regular pattern or irregular orientation that will provide the desired adhesion between tile 24 and reinforcing member 14 that will survive the temperatures, pressures, and forces applied deflection member 10 during the papermaking process. If adhesive 26B is disposed in a striped pattern on the backside 20 of tile 24, the stripes can be spaced and oriented with respect to the MD and CD appropriately, depending on the size and shape and open space of the tiles, and the open area of reinforcing member 14, so that sufficient joining is achieved depending on the requirements of the fibrous structure making process. The stripes can be parallel or non-parallel, and they can be curvilinear or straight. The stripes may be oriented in the X-direction, the Y-direction, or between the X and Y directions, for example, on a diagonal to either the X-direction or the Y-direction. Stripes of adhesive may also be oriented in multiple directions, and may fail to intersect with one another in, for example, a zig-zag pattern, or may intersect with each other in, for example, a cross-hatching pattern. Other exemplary adhesive patterns may include discontinuous dots, a checkerboard pattern, and patterns that are controlled to match surface contact points between reinforcing structure 14 and the bottom of tile 24. Other exemplary adhesive patterns may include discrete shapes (e.g., circles, ovals, polygons, etc.) placed down in orthogonal, sinusoidal regular or irregular patterns. Patterns of adhesive may be applied to tile 24 and/or reinforcing member 14 through the utilization of slot coaters, gravure rolls, kiss coating rolls, spray coaters, plasma coaters, brushes, wipers, wipes, dispensing assemblies, dipping, dipping with pneumatic removal of excess, dipping with solvent removal of excess, dipping with vacuum removal of excess, capillary applications, etc.

Tile 24 and reinforcing member 14 may also be fastened together through a solvent welding process. Particular solvents that may be used in the solvent welding process include isopropyl alcohol, dichloromethane, dichloromethane-tetrahydrofuran, acetone, cyclohexanone, N,N-Dimethyl formamide, ethyl acetate, dichloroethane, glacial acetic acid, methyl ethyl ketone, 2-methoxy ethanol, N-methyl pyrrolidone, O-dichlorobenzol, tetrachloroethylene, tetrahydrofuran, toluene, xylene; formic acid, phenol, resorcinol or cresol in aqueous or alcoholic solutions; and calcium chloride in alcoholic solutions. Other welding processes could also be utilized including, but not limited to, thermal welding, ultrasonic welding, and laser welding, as detailed in U.S. Publication No. 2016/009,0693.

Solvent can be applied to either backside 20 of tile 24, or to reinforcing member 14, or to both the backside of the tile and the reinforcing member. Solvent can be applied over the entire tile and/or the reinforcing member, or substantially the entire tile and/or reinforcing member, or in any regular pattern or irregular orientation that will provide good adhesion between tile 24 and reinforcing member 14 that will survive the temperatures, pressures, and forces applied to deflection member 10 during the papermaking process. If solvent is disposed in a striped pattern on the backside 20 of tile 24, the stripes can be spaced and oriented with respect to the MD and CD appropriately, depending on the size and shape of tiles and the open area of the reinforcing member 14 so that sufficient joining is achieved depending on the requirements of the fibrous structure making process. The stripes can be parallel or non-parallel, and they can be curvilinear or straight. The stripes may be oriented in the X-direction, the Y-direction, or between the X and Y directions, for example, on a diagonal to either the X-direction or the Y-direction. Stripes of solvent may also be oriented in multiple directions, and may fail to intersect with one another in, for example, a zig-zag pattern, or may intersect with each other in, for example, a cross-hatching pattern. Other exemplary adhesive patterns may include discontinuous dots, a checkerboard pattern, and patterns that are controlled to match surface contact points between the reinforcing structure and the bottom of tile 24. Other exemplary solvent patterns may include discrete shapes (e.g., circles, ovals, polygons, etc.) placed down in orthogonal, sinusoidal regular or irregular patterns. Patterns of solvent may be applied to tile 24 and/or reinforcing member 14 through the utilization of slot coaters, gravure rolls, kiss coating rolls, spray coaters, plasma coaters, brushes, wipers, wipes, dispensing assemblies, dipping, dipping with pneumatic removal of excess, dipping with solvent removal of excess, dipping with vacuum removal of excess, capillary applications, etc., and combinations thereof.

After adhesive 26B and/or solvent have been applied to backside 20 of tile 24 and/or the web side of reinforcing member 14, the tile and reinforcing member may be brought in contact and/or pressed together. Tile 24 and reinforcing member 14 may be pressed together in any type of pressing method/apparatus known in the art. As a non-limiting example, tile 24 and reinforcing member 14 may be pressed together in a line process in between rollers. After pressing, tile 24 (or many tiles in a patterned framework as detailed above) and reinforcing member 14 will form a laminate material, as illustrated in FIG. 15. If the utilized adhesive was a light activated adhesive or a heat activated adhesive, a light or heat application (as necessary) would be applied to the laminate to cure the adhesive.

Further, before attachment of tile 24 to reinforcing member 14 with adhesive, the surface of the tile and/or the reinforcing member that contacts the adhesive may be pretreated. Non-limiting pretreatments may include primers, corona/plasma treatments, swelling the tile and/or reinforcing member material for increased adhesion treatment, and sanding/roughening the surface to increase surface area. In some non-limiting examples, one or both of the surfaces may be treated as detailed in U.S. Pat. No. 7,105,465 issued Sep. 12, 2006 in the name of Patel et al.

Resin

Figure 16:
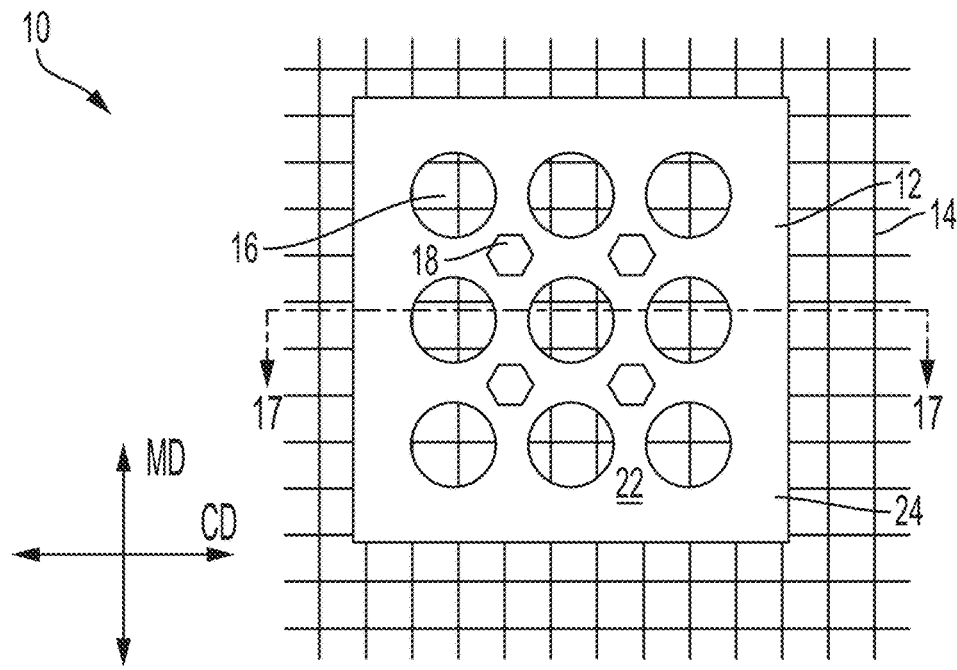
FIG. 16 is a plan view of a form of a deflection member of the present invention.
Figure 17:
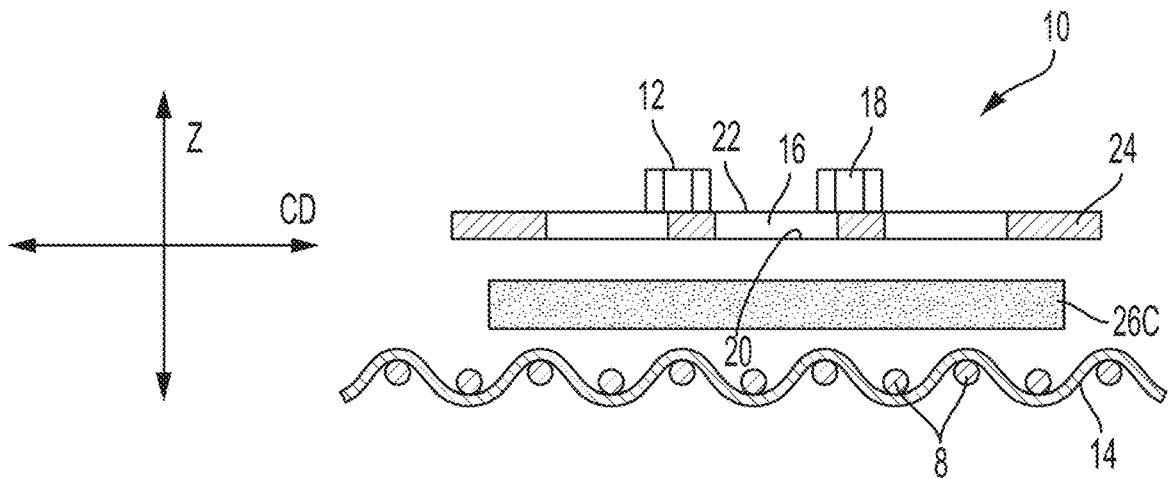
FIG. 17 is a cross-sectional view of the deflection member shown in FIG. 16, taken along lines 17-17 of FIG. 16, before the tile and reinforcing member are brought in contact.
Figure 18:
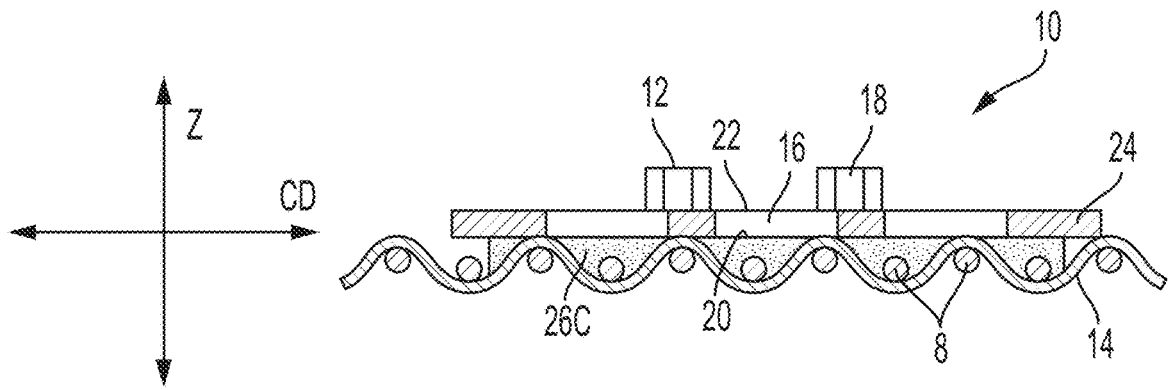
FIG. 18 is a cross-sectional view of the deflection member shown in FIG. 16, taken along lines 17-17 of FIG. 16, after the tile and reinforcing member are brought in contact.

In another form of deflection member 10, as illustrated in FIGS. 16-18, tile 24 can be fastened to reinforcing member 14 by utilizing a resin to adhere the tile onto the reinforcing member. When fastening with resin, fastening element 26C can be a resin selected from the group comprising light activated resins, heat activated resins and combinations thereof. In some deflection members 10, the utilized resin may be as described in U.S. Pat. No. 4,514,345 issued Apr. 30, 1985 in the name of Johnson et al., and/or as described in U.S. Pat. No. 6,010,598 issued Jan. 4, 2000 in the name of Boutilier et al. In other deflection members 10, the utilized resin may be as described in U.S. Pat. No. 7,445,831 issued Nov. 4, 2008 in the name of Ashraf et al.

Resin 26C can be applied to either backside 20 of tile 24, or to reinforcing member 14, or to both the backside of the tile and the reinforcing member, or as a separate element between the tile and the reinforcing member (as depicted in FIG. 17). In one form of deflection member 10, resin 26C is only applied to reinforcing member 14 (in forms where reinforcing member 14 is a woven sheet, adhesive flows around filaments 8 and into the holes of the weave). In another form of deflection member 10, resin 26C is only applied to the backside of the tile. Total resin 26C can be applied in a thickness of about 1 micron to about 2500 microns, or about 1 micron to about 1000 microns, or about 1 micron to about 500 microns, or about 1 micron to about 300 microns, or about 150 microns to about 500 microns, or about 150 microns to about 300 microns.

Resin 26C can be applied over the entire tile and/or the reinforcing member, or substantially the entire tile and/or reinforcing member, or in any regular pattern or irregular orientation that will provide the desired adhesion between tile 24 and reinforcing member 14 that will survive the temperatures, pressures, and forces applied during the papermaking process. If resin 26C is disposed in a striped pattern on the backside 20 of tile 24, the stripes can be spaced and oriented with respect to the MD and CD appropriately, depending on the size and shape of tiles and the open area of the reinforcing member 14 so that sufficient joining is achieved depending on the requirements of the fibrous structure making process. The stripes can be parallel or non-parallel, and they can be curvilinear or straight. The stripes may be oriented in the X-direction, the Y-direction, or between the X and Y directions, for example, on a diagonal to either the X-direction or the Y-direction. Stripes of resin may also be oriented in multiple directions, and may fail to intersect with one another in, for example, a zig-zag pattern, or may intersect with each other in, for example, a cross-hatching pattern. Other exemplary resin patterns may include discontinuous dots, a checkerboard pattern, and patterns that are controlled to match surface contact points between the reinforcing structure and the bottom of tile 24. Other exemplary resin patterns may include discrete shapes (e.g., circles, ovals, polygons, etc.) placed down in orthogonal, sinusoidal regular or irregular patterns. Patterns of resin may be applied to tile 24 and/or reinforcing member 14 through the utilization of additive manufacturing methods such as 3-D printing, slot coaters, gravure rolls, kiss coating rolls, spray coaters, plasma coaters, brushes, wipers, wipes, dispensing assemblies, dipping, dipping with pneumatic removal of excess, dipping with solvent removal of excess, dipping with vacuum removal of excess, capillary applications, etc.

After resin 26C has been applied to backside 20 of tile 24 and/or the web side surface of reinforcing member 14, the resin may be at least partially cured before the tile and reinforcing member are contacted and/or pressed together (for example, by application of UV light, or heat, or whatever the requisite curing medium is for the particular resin). Tile 24 and reinforcing member 14 may be pressed together in any type of pressing method/apparatus known in the art. As a non-limiting example, tile 24 and reinforcing member 14 may be pressed together in a line process in between rollers. After pressing, tile 24 (or many tiles in a patterned framework as detailed above) and reinforcing member 14 will form a laminate material, as illustrated in FIG. 18. In forms of deflection member 10 where the resin was partially cured before pressing, the partially cured resin may then be further cured, or fully cured, in a second curing step. In forms of deflection member 10 where the resin was not partially cured before pressing, the uncured resin may be partially cured, or fully cured, in a post-pressing, curing step.

In one form of deflection member 10, resin 26C is a UV light curable resin, and deposited on web side surface 22 of reinforcing member 14. After deposition, the resin is partially cured in a UV light application. Tile 24 and reinforcing member 14 are then pressed in a line process to form a laminate. The partially cured resin 26C of the laminate is then further cured in a second application of UV light.

Mechanical Fasteners

In another form of deflection member 10, tile 24 can be fastened to reinforcing member 14 by mechanically fastening the tile onto the reinforcing member. When fastening is attained by mechanical fastening, fastening element 26D can be a mechanical fastener made from metal, ferrous materials, metal-impregnated resins, ferrous-impregnated resins, plastics, crosslinked polymers, thermoplastics, metal-impregnated thermoplastics, ferrous-impregnated thermoplastics, amorphous thermoplastics, semi-crystalline thermoplastics, crystalline thermoplastics, thermosets, photopolymers, and combinations thereof. Other forms of mechanical fastening between tile 24 and reinforcing member 14 may also be implemented through heat fusion, ultrasonic welding and/or laser welding. The mechanical fastening can be permanent or temporary, depending on the desired application. Forms of mechanical fastening that may be useful in the deflection members detailed herein are found in U.S. Pat. Nos. 9,616,638; 5,983,467; 6,124,015; 6,902,787; and 7,220,340; and US Publication No. 2003/0190451.

Tile 24 and mechanical fasteners 26D may be made of the same material, partially from the same material, or from wholly different materials. Further, the material making up mechanical fastener 26D on tile 24 may differ from tile to tile in a patterned framework 12. In other forms of deflection member 10 disclosed herein, the material making up mechanical fastener 26D may be the same, or at least partially the same, from tile to tile in a patterned framework 12.

Figure 19:
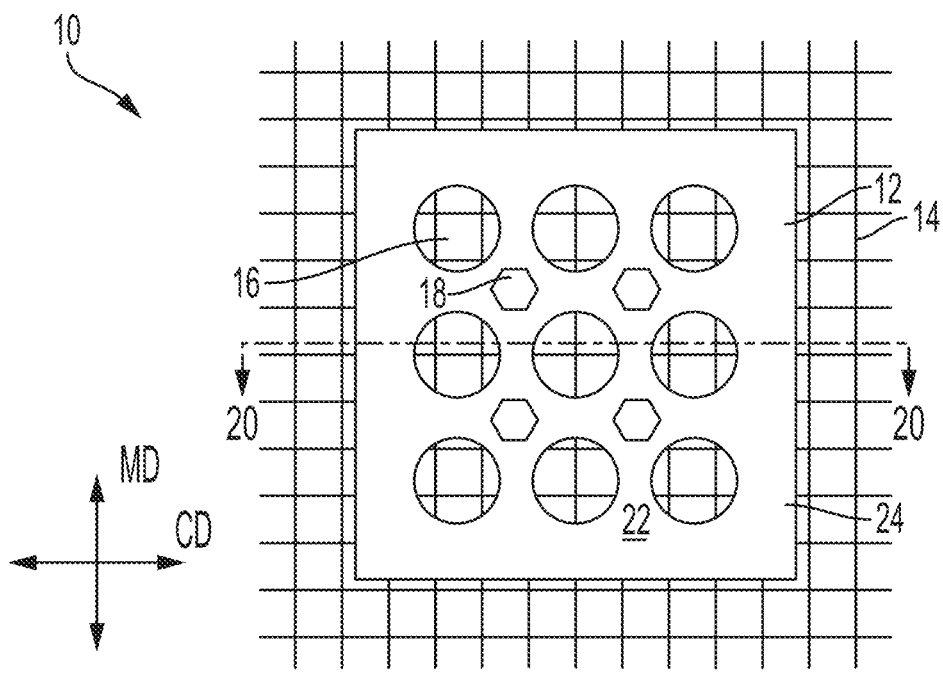
FIG. 19 is a plan view of a form of a deflection member of the present invention.
Figure 20:
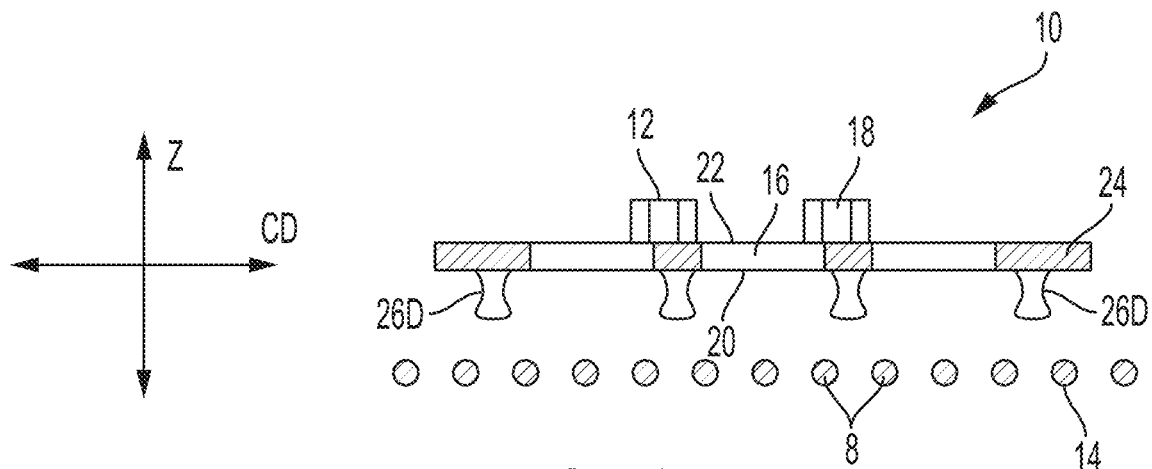
FIG. 20 is a cross-sectional view of the deflection member shown in FIG. 19, taken along lines 20-20 of FIG. 19, before the tile and reinforcing member are brought in contact.
Figure 21:
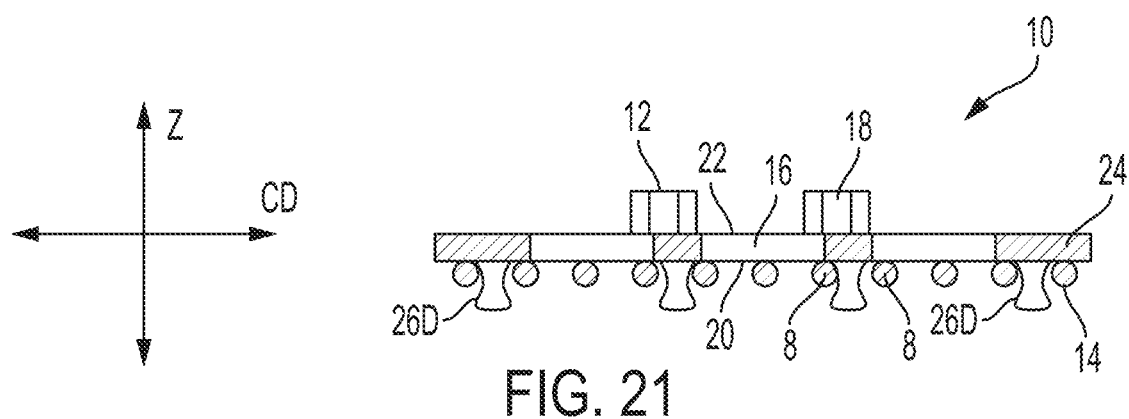
FIG. 21 is a cross-sectional view of the deflection member shown in FIG. 19, taken along lines 20-20 of FIG. 19, after the tile and reinforcing member are brought in contact.

As illustrated in FIGS. 19-21, mechanical fasteners 26D are disposed on backside 20 of tile 24. If the tile is additively manufactured in a process such as 3-D printing, the mechanical fasteners can be printed onto the backside of the tile. FIG. 19 illustrates the top side of tile 24, and mechanical fasteners 26D are on the backside of the tile, and therefore not shown. FIG. 20 illustrates a cross sectional view of FIG. 19, the view taken through line 20-20. In this figure, mechanical fasteners 26D are visible on backside 20 of tile 24. As further detailed below, during the fastening process, the mechanical fasteners 26D on tile 24 may be pressed/snapped/locked/temporarily locked into the open area of reinforcing member 14 (e.g., between the filaments of a woven reinforcing member).

In one non-limiting form of deflection member 10, as illustrated in FIGS. 19-21, reinforcing member 14 is made of woven filaments 8, and tile 24 is mechanically fastened onto the reinforcing member by the mechanical fasteners 26D being pressed through the holes in the weave of the reinforcing member. The shape of the mechanical fastener 26D will function to hold tile 24 to reinforcing member 14. In such a form, tile 24 and reinforcing member 14 may be temporarily fastened to one another, allowing the removal of the particular tile when it wears out through extended use.

Mechanical fastener 26D can be made in any size and or shape that is desirable to support the temporary or permanent fastening of tile 24 to reinforcing member 14 in a particular application. In the form of deflection member 10 that is illustrated in FIGS. 19-21 (shown in cross section with CD filaments removed for clarity), mechanical fasteners 26D are curved with a drawn-in waist portion, and are tall enough in the Z-direction (i.e., height of the mechanical fastener) to allow the mechanical fastener to penetrate the weave of reinforcing member 14 far enough to snap into place. However, other mechanical fastener sizes and shape are also within the scope of this disclosure. For example, in some forms of deflection member 10, mechanical fasteners may be shaped as hooks (e.g., such as Velcro® type hooks), cubes, spheres, various curved shapes, cylinders, pentagonal prisms, hexagonal prisms, heptagonal prisms, octagonal prisms, other various prisms, and combinations thereof. In some forms of deflection member 10, mechanical fasteners 26D may have a height of about 3 mils to about 100 mils, or about 5 mils to about 50 mils, or about 10 mils to about 40 mils, or about 15 mils to about 30 mils, or about 20 mils to about 25 mils.

Mechanical fasteners 26D may be disposed on backside 20 of tile 24 in any regular pattern or irregular orientation. If mechanical fasteners 26D are disposed in rows on the backside of the tile, the rows of mechanical fasteners can be spaced and oriented with respect to the MD and CD appropriately, depending on the size and shape and open area of tiles, and the open area of the reinforcing member 14, so that sufficient joining is achieved depending on the requirements of the fibrous structure making process. The rows can be parallel or non-parallel, and they can be curvilinear or straight. The rows may be oriented in the X-direction, the Y-direction, or between the X and Y directions, for example, on a diagonal to either the X-direction or the Y-direction. Rows of rivets may also be oriented in multiple directions, and may fail to intersect with one another in, for example, a zig-zag pattern, or may intersect with each other in, for example, a cross-hatching pattern.

Tile 24 and reinforcing member 14 may be pressed together, thus forcing/snapping/locking the mechanical fasteners 26D through the holes of the reinforcing member. Tile 24 and reinforcing member 14 may be pressed together by hand or in any type of pressing method/apparatus known in the art. As a non-limiting example, tile 24 and reinforcing member 14 may be pressed together in a line process in between rollers. After pressing, tile 24 (or many tiles in a patterned framework as detailed above) and reinforcing member 14 will form a laminate material, as illustrated in FIG. 21. In forms of deflection member 10 that include reversible snaps, tile 24 may be removed and reapplied to reinforcing member 14 as desired.

Combinations

In the various forms of deflection member 10 contemplated herein, any of the above detailed fastening elements 26, 26A, 26B, 26C, 26D may be used in combination. For example, in one form of deflection member 10, a patterned framework of tiles 24 is fastened to reinforcing member 14 through both stitching and adhesive. In such a deflection member, the tiles are stitched to one another to form patterned framework 12 that is unitary. The unitary patterned framework is then attached to reinforcing member 14 though the utilization of adhesive. In another form of deflection member 10, a patterned framework of tiles 24 is again fastened to reinforcing member 14 through both stitching and adhesive. In such a deflection member, the tile(s) are adhered to reinforcing member 14 though the utilization of a temporary adhesive, such as a water soluble glue. The tile(s) are then stitched to reinforcing member 14. Deflection member 10 may then be sprayed with water in order to dissolve the water soluble glue, thus removing glue from any of the open areas within reinforcing member 14, allowing greater air permeability through deflection member 10.

In another exemplary form of deflection member 10, a patterned framework of tiles 24 is fastened to reinforcing member 14 through both stitching and riveting. In such a deflection member, the tiles are stitched to one another to form patterned framework 12 that is unitary. The unitary patterned framework is then attached to reinforcing member 14 though the utilization of rivets. In another exemplary form of deflection member 10, a patterned framework of tiles 24 is fastened to reinforcing member 14 through both stitching and resin. In such a deflection member, the tiles are stitched to one another to form patterned framework 12 that is unitary. The unitary patterned framework is then attached to reinforcing member 14 though the utilization of resin.

Fibrous Structure:

One purpose of the deflection member 10 is to provide a forming surface on which to mold fibrous structures, including sanitary tissue products, such as paper towels, toilet tissue, facial tissue, wipes, dry or wet mop covers, nonwovens such as baby care and fem care topsheet materials, and the like. When used in a papermaking process, deflection member 10 can be utilized in the "wet end" of a papermaking process, as described in more detail below, in which fibers from a fibrous slurry are deposited on web side surface 22 of deflection member 10. As discussed below, a portion of the fibers can be deflected into deflection conduits 16 and onto protuberances 18 of deflection member 10 to cause some of the deflected fibers or portions thereof to be disposed within the deflection conduits of the deflection member. Similarly, deflection member 10 can be used to catch fibers in a nonwoven making process.

Thus, as can be understood from the description above, fibrous structure 500 can mold to the general shape of deflection member 10 such that the shape and size of the three-dimensional features of the fibrous structure are a close approximation of the size and shape of protuberances 18 and deflection conduits 16. Further, in forms herein that include deflection member 10 having tiles 24 stitched on their web side surface 22 to reinforcing member 14, the fibrous structure 500 that is produced will further include an imprint of the thread 26 used to fasten the tile to the reinforcing member. Thus, the produced fibrous structure 500 will include additional structure due to the presence of thread 26 on the web side surface 22 of tile 24, as fibers of the fibrous structure are laid down over and around the thread(s).

Process for Making Fibrous Structure:

In one form, deflection members 10 as disclosed herein may be used in a nonwoven making process to capture/mold fibers in the creation of a nonwoven web, the type of which is commonly used in baby and fem care products. Such processes use forced air and/or vacuum to draw fibers down into deflection member 10.

Figure 22:
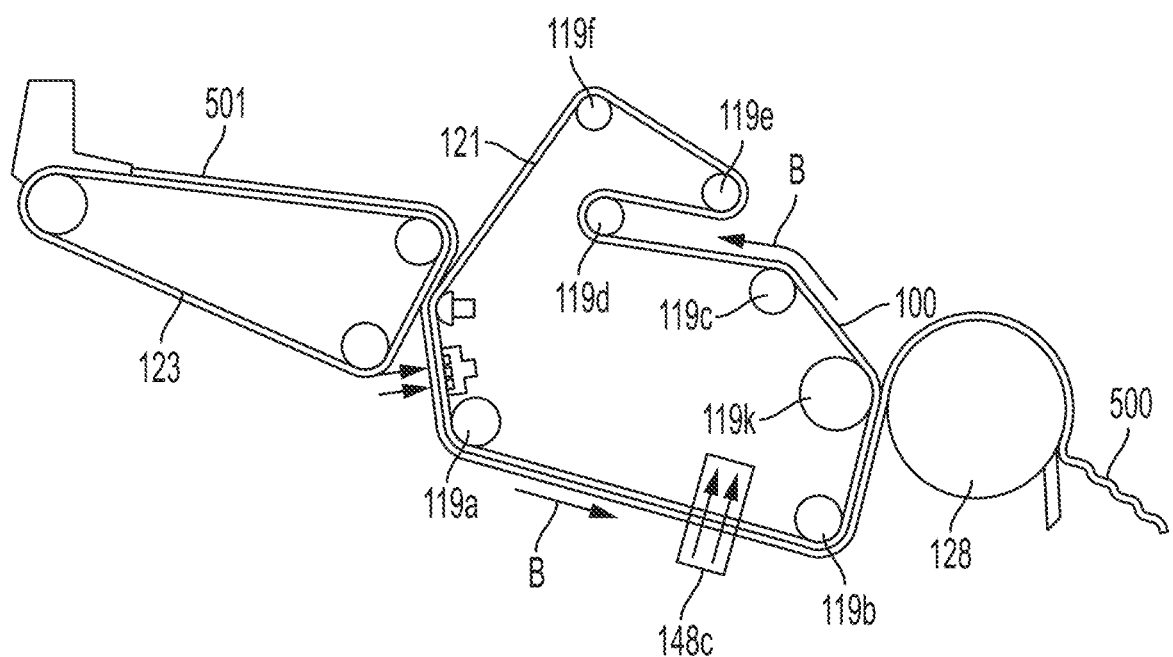
FIG. 22 is a schematic representation of a papermaking process.

In another form, deflection members 10 as disclosed herein may be used in a papermaking process. With reference to FIG. 22, one exemplary form of the process for producing fibrous structure 500 of the present disclosure comprises the following steps, which could be employed to make a fibrous structure with deflection member 10 disclosed herein. First, a plurality of fibers 501 is provided and is deposited on a forming wire of a papermaking machine, as is known in the art.

The present invention contemplates the use of a variety of fibers, such as, for example, cellulosic fibers, synthetic fibers, or any other suitable fibers, and any combination thereof. Papermaking fibers useful in the present invention include cellulosic fibers commonly known as wood pulp fibers. Fibers derived from soft woods (gymnosperms or coniferous trees) and hard woods (angiosperms or deciduous trees) are contemplated for use in this invention. The particular species of tree from which the fibers are derived is immaterial. The hardwood and softwood fibers can be blended, or alternatively, can be deposited in layers to provide a stratified web. U.S. Pat. No. 4,300,981 issued Nov. 17, 1981 in the name of Carstens; and U.S. Pat. No. 3,994,771 issued Nov. 30, 1976 in the name of Morgan et al. are incorporated herein by reference for the purpose of disclosing layering of hardwood and softwood fibers.

The wood pulp fibers can be produced from the native wood by any convenient pulping process. Chemical processes such as sulfite, sulfate (including the Kraft) and soda processes are suitable. Mechanical processes such as thermomechanical (or Asplund) processes are also suitable. In addition, the various semi-chemical and chemi-mechanical processes can be used. Bleached as well as unbleached fibers are contemplated for use. When the fibrous web of this invention is intended for use in absorbent products such as paper towels, bleached northern softwood Kraft pulp fibers may be used. Wood pulps useful herein include chemical pulps such as Kraft, sulfite and sulfate pulps as well as mechanical pulps including for example, ground wood, thermomechanical pulps and Chemi-ThermoMechanical Pulp (CTMP). Pulps derived from both deciduous and coniferous trees can be used.

In addition to the various wood pulp fibers, other cellulosic fibers such as cotton linters, rayon, and bagasse can be used in this invention. Synthetic fibers, such as polymeric fibers, can also be used. Elastomeric polymers, polypropylene, polyethylene, polyester, polyolefin, and nylon, can be used. The polymeric fibers can be produced by spunbond processes, meltblown processes, and other suitable methods known in the art. It is believed that thin, long, and continuous fibers produces by spunbond and meltblown processes may be beneficially used in the fibrous structure of the present invention, because such fibers are believed to be easily deflectable into the pockets of the deflection member of the present invention.

The paper furnish can comprise a variety of additives, including but not limited to fiber binder materials, such as wet strength binder materials, dry strength binder materials, chemical softening compositions, latexes, bicomponent fibers with a soften-able or melt-able outer shell, and thermoplastic fibers. Suitable wet strength binders include, but are not limited to, materials such as polyamide-epichlorohydrin resins sold under the trade name of KYMENE™ 557H by Hercules Inc., Wilmington, Del. Suitable temporary wet strength binders include but are not limited to synthetic polyacrylates. A suitable temporary wet strength binder is PAREZ™ 750 marketed by American Cyanamid of Stanford, Conn. Suitable dry strength binders include materials such as carboxymethyl cellulose and cationic polymers such as ACCO™ 711. The CYPRO/ACCO family of dry strength materials are available from CYTEC of Kalamazoo, Mich. Forms of fiber bonding may also be utilized, including, but not limited to, carding and hydroentangling.

The paper furnish can comprise a debonding agent to inhibit formation of some fiber to fiber bonds as the web is dried. The debonding agent, in combination with the energy provided to the web by the dry creping process, results in a portion of the web being debulked. In one form, the debonding agent can be applied to fibers forming an intermediate fiber layer positioned between two or more layers. The intermediate layer acts as a debonding layer between outer layers of fibers. The creping energy can therefore debulk a portion of the web along the debonding layer. Suitable debonding agents include chemical softening compositions such as those disclosed in U.S. Pat. No. 5,279,767 issued Jan. 18, 1994 in the name of Phan et al., the disclosure of which is incorporated herein by reference Suitable biodegradable chemical softening compositions are disclosed in U.S. Pat. No. 5,312,522 issued May 17, 1994 in the name of Phan et al.; U.S. Pat. Nos. 5,279,767 and 5,312,522, the disclosures of which are incorporated herein by reference. Such chemical softening compositions can be used as debonding agents for inhibiting fiber to fiber bonding in one or more layers of the fibers making up the web. One suitable softener for providing debonding of fibers in one or more layers of fibers forming the web is a papermaking additive comprising DiEster Di (Touch Hardened) Tallow Dimethyl Ammonium Chloride. A suitable softener is ADOGEN® brand papermaking additive available from Witco Company of Greenwich, Conn.

The embryonic web can be typically prepared from an aqueous dispersion of papermaking fibers, though dispersions in liquids other than water can be used. The fibers are dispersed in the carrier liquid to have a consistency of from about 0.1 to about 0.3 percent. Alternatively, and without being limited by theory, it is believed that the present invention is applicable to moist forming operations where the fibers are dispersed in a carrier liquid to have a consistency less than about 50 percent. In yet another alternative form, and without being limited by theory, it is believed that the present invention is also applicable to layered wires, structured wires, wet micro contraction, vacuum dewatering, airlaid structures, including air-laid webs comprising pulp fibers, synthetic fibers, and mixtures thereof.

Conventional papermaking fibers can be used and the aqueous dispersion can be formed in conventional ways. Conventional papermaking equipment and processes can be used to form the embryonic web on the Fourdrinier wire. The association of the embryonic web with the deflection member can be accomplished by simple transfer of the web between two moving endless belts as assisted by differential fluid pressure. The fibers may be deflected into the deflection member 10 by the application of differential fluid pressure induced by an applied vacuum. Any technique, such as the use of a Yankee drum dryer, can be used to dry the intermediate web. Foreshortening can be accomplished by any conventional technique such as creping.

The plurality of fibers can also be supplied in the form of a moistened fibrous web (not shown), which should preferably be in a condition in which portions of the web could be effectively deflected into the deflection conduits of the deflection member and the void spaces formed between the suspended portions and the X-Y plane.

The embryonic web comprising fibers 501 is transferred from a forming wire 123 to a belt 121 on which deflection member 10 as detailed herein can be disposed by placing it on the belt 121 upstream of a vacuum pick-up shoe 148a. Alternatively or additionally, a plurality of fibers, or fibrous slurry, can be deposited onto deflection member 10 directly from a headbox or otherwise, including in a batch process, (not shown). The papermaking belt 100 comprising deflection member 10 held between the embryonic web and the belt 121 can travel past optional dryers/vacuum devices 148b and about rolls 119a, 119b, 119k, 119c, 119d, 119e, and 119f in the direction schematically indicated by the directional arrow "B".

A portion of fibers 501 can be deflected into deflection member 10 such as to cause some of the deflected fibers to be disposed within the deflection conduits 16 of the deflection member. Depending on the process, mechanical and fluid pressure differential, alone or in combination, can be utilized to deflect a portion of fibers 501 into deflection conduits 16 of deflection member 10. For example, in a through-air drying process a vacuum apparatus 148c can apply a fluid pressure differential to the embryonic web disposed on deflection member 10, thereby deflecting fibers into the deflection conduits of the deflection member. The process of deflection may be continued with additional vacuum pressure, if necessary, to even further deflect the fibers into the deflection conduits of deflection member 10.

Finally, a partly-formed fibrous structure associated with deflection member 10 can be separated from the deflection member at roll 119k at the transfer to a Yankee dryer 128. By doing so, deflection member 10, having the fibers thereon, is pressed against a pressing surface, such as, for example, a surface of a Yankee drying drum 128. After being creped off the Yankee dryer, a fibrous structure 500 results and can be further processed or converted as desired.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any form disclosed or claimed herein or that it alone, or in any combination with any other reference or references, teaches, suggests or discloses any such form. Further, to the extent that any meaning or definition of a term in this document conflicts with any meaning or definition of the same term in a document incorporated by reference, the meaning or definition assigned to that term in this document shall govern.

While particular forms of the present disclosure have been illustrated and described, it would be obvious to those skilled in the art that various other changes and modifications can be made without departing from the spirit and scope of the present disclosure. It is therefore intended to cover in the appended claims all such changes and modifications that are within the scope of this disclosure.

What is claimed is:

1. A deflection member, the deflection member comprising a reinforcing member and a plurality of tiles fastened to the reinforcing member with rivets, wherein at least one of the plurality of tiles is stitched to at least another of the plurality of tiles to create a multi-tile grouping before the plurality of tiles in the multi-tile grouping are riveted to the reinforcing member.

2. The deflection member of claim 1, wherein each of the plurality of tiles is additively manufactured.

3. The deflection member of claim 1, wherein the rivets are additively manufactured onto a back side of the plurality of tiles.

4. The deflection member of claim 3, wherein the rivets are 3-D printed onto a back side of the plurality of tiles.

5. The deflection member of claim 1, wherein the rivets comprise metal, ferrous materials, metal-impregnated resins, ferrous-impregnated resins, plastics, crosslinked polymers, thermoplastics, metal-impregnated thermoplastics, ferrous-impregnated thermoplastics, amorphous thermoplastics, semi-crystalline thermoplastics, crystalline thermoplastics, thermosets, photopolymers, UV curable resins, and combinations thereof.

6. The deflection member of claim 1, wherein the rivets comprise ferrous materials.

7. The deflection member of claim 1, wherein the rivets have a Z-direction height of between about 3 mils and about 100 mils.

8. The deflection member of claim 1, wherein each of the plurality of tiles has a single tessellating shape, wherein the plurality of tiles are fastened to the reinforcing member to form a patterned framework in a tessellating pattern.

9. The deflection member of claim 1, wherein the plurality of tiles are fastened to the reinforcing member to form a patterned framework of tiles, wherein the patterned framework has less than about 3 mm between adjacent tiles.

10. A deflection member, the deflection member comprising:
   a. a fluid pervious reinforcing member, the reinforcing member comprising woven filaments; and,
   b. a patterned framework comprising a plurality of tiles fastened to the reinforcing member by riveting with rivets, the tiles comprising regularly spaced protuberances extending in a Z-direction,
   wherein at least one of the plurality of tiles is stitched to at least another of the plurality of tiles to create a multi-tile grouping before the plurality of tiles in the multi-tile grouping are riveted to the reinforcing member.

11. The deflection member of claim 10, wherein each of the plurality of tiles is additively manufactured.

12. The deflection member of claim 10, wherein the rivets are additively manufactured onto a back side of the plurality of tiles.

13. The deflection member of claim 12, wherein the rivets are 3-D printed onto a back side of the plurality of tiles.

14. The deflection member of claim 10, wherein the rivets comprise metal, ferrous materials, metal-impregnated resins, ferrous-impregnated resins, plastics, crosslinked polymers, thermoplastics, metal-impregnated thermoplastics, ferrous-impregnated thermoplastics, amorphous thermoplastics, semi-crystalline thermoplastics, crystalline thermoplastics, thermosets, photopolymers, UV curable resins, and combinations thereof.

15. The deflection member of claim 10, wherein the rivets comprise ferrous materials.

16. The deflection member of claim 10, wherein the rivets have a Z-direction height of between about 3 mils and about 100 mils.

17. The deflection member of claim 10, wherein each of the plurality of tiles has a single tessellating shape, wherein the plurality of tiles are fastened to the reinforcing member to form a patterned framework in a tessellating pattern.

18. The deflection member of claim 10, wherein the plurality of tiles are fastened to the reinforcing member to form a patterned framework of tiles, wherein the patterned framework has less than about 3 mm between adjacent tiles.

\* \* \* \* \*